United States Patent

[11] 3,611,361

[72] Inventors John H. Gallichotte
Newtown;
Donald E. Hansen, Brookfield Center;
James A. Marquis, Danbury; William J. Shaughnessy, Brookfield Center, all of Conn.
[21] Appl. No. 873,387
[22] Filed Nov. 3, 1969
[45] Patented Oct. 5, 1971
[73] Assignee American Standard Inc.
New York, N.Y.

[54] ALARM-MONITORING SYSTEM
18 Claims, 22 Drawing Figs.
[52] U.S. Cl. .................................................. 340/408, 179/1.5, 343/6.5, 340/206, 340/150
[51] Int. Cl. .................................................. G08b 25/00, H04q 9/14
[50] Field of Search .......................................... 340/213, 408, 150, 151, 206; 179/1.5; 343/6.5

[56] References Cited
UNITED STATES PATENTS
3,131,376  4/1964  Duvall .......................... 340/408
3,171,108  2/1965  Mackeen ....................... 340/408

Primary Examiner—John W. Caldwell
Assistant Examiner—Robert J. Mooney
Attorney—Wood, Herron & Evans ABSTRACT: A system for monitoring at a central station the condition, alarm or nonalarm, of a plurality of alarm condition sensors located at a remote station, including interrogation signal means at the central station for interrogating the remote station prior to transmission of each signal of a multisignal train, the interrogation occurring following the expiration of the random-length delays initiated when signals are received from the remote station, thereby rendering the interrogation process and the resultant signal transmission process aperiodic in nature; a first transmitting means at said remote station responsive to the receipt of interrogation signals for transmitting a first width-modulated binary signal train when none of the alarm condition sensors is in an alarm condition and a complete inversion thereof when an alarm condition sensor is in an alarm condition; a second transmitting means at the remote station also responsive to the interrogation signals for transmitting a second width-modulated binary signal train when none of the sensors is in an alarm condition, the second width-modulated train having as many signals as there are sensors individually monitored with each sensor associated with a different signal, and for transmitting an inversion of a sensor-associated signal when the associated sensor is in an alarm condition; detecting means at the central station for analyzing the output of the first transmitting means to determine if the first signal train, or a complete inversion thereof, was transmitted and to determine if a sensor-associated signal, or the inversion thereof, was transmitted; and a plurality of alarm indicators each corresponding to a different one of the remote station sensors being individually monitored, each indicator being activated when its respective remote station sensor is in an alarm condition and both an inversion of its respective sensor-associated signal and a complete inversion of the first signal train are detected.

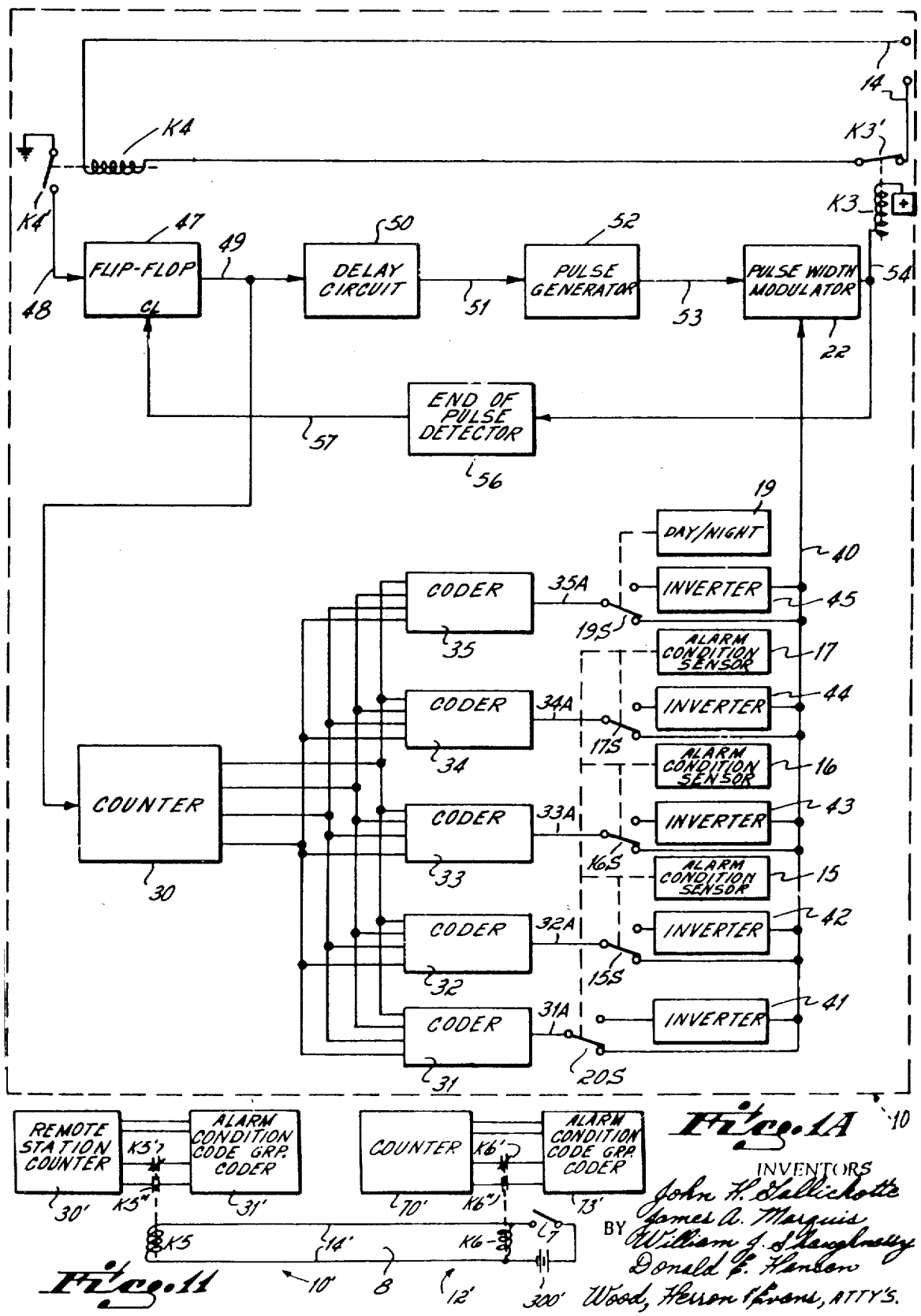

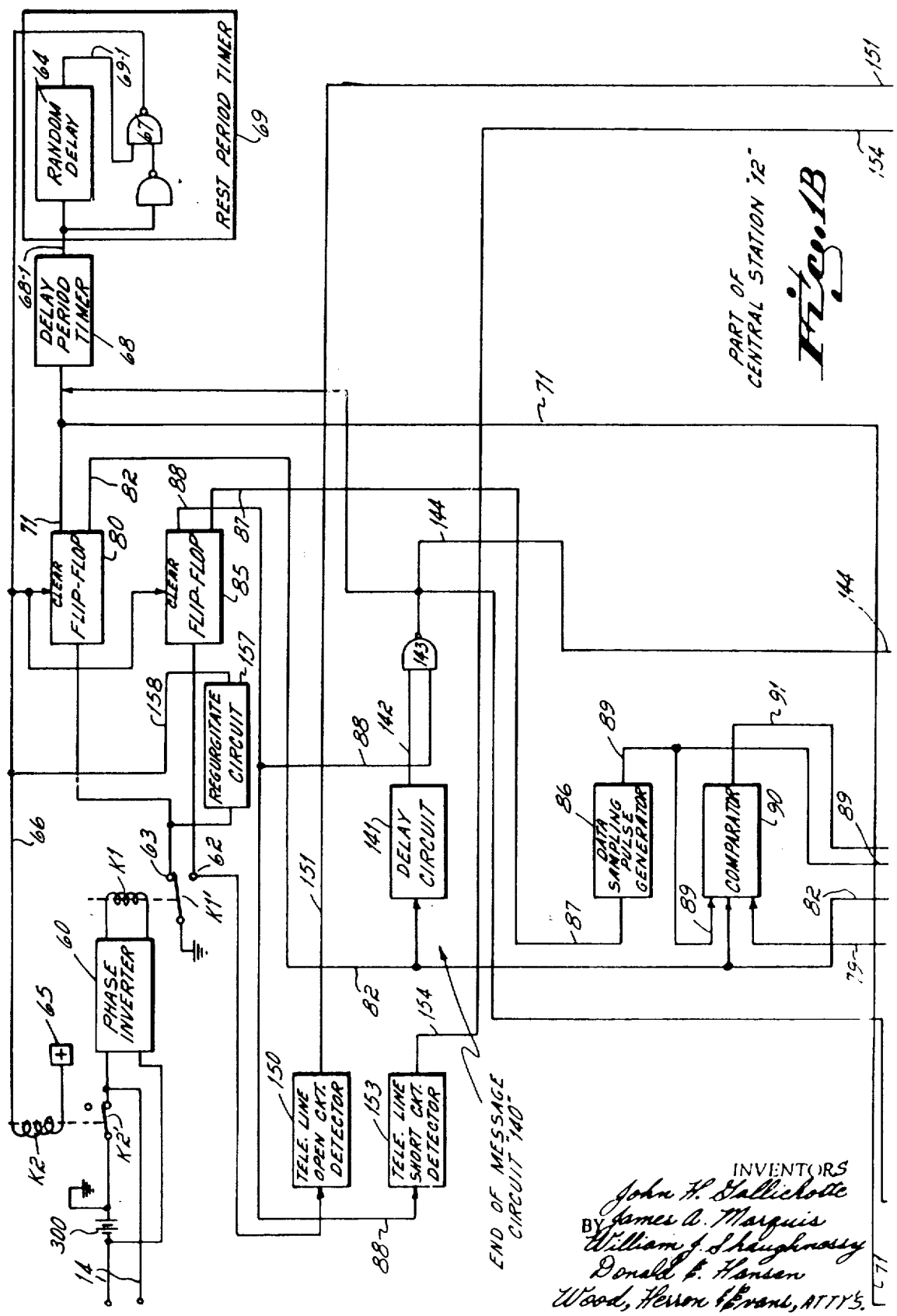

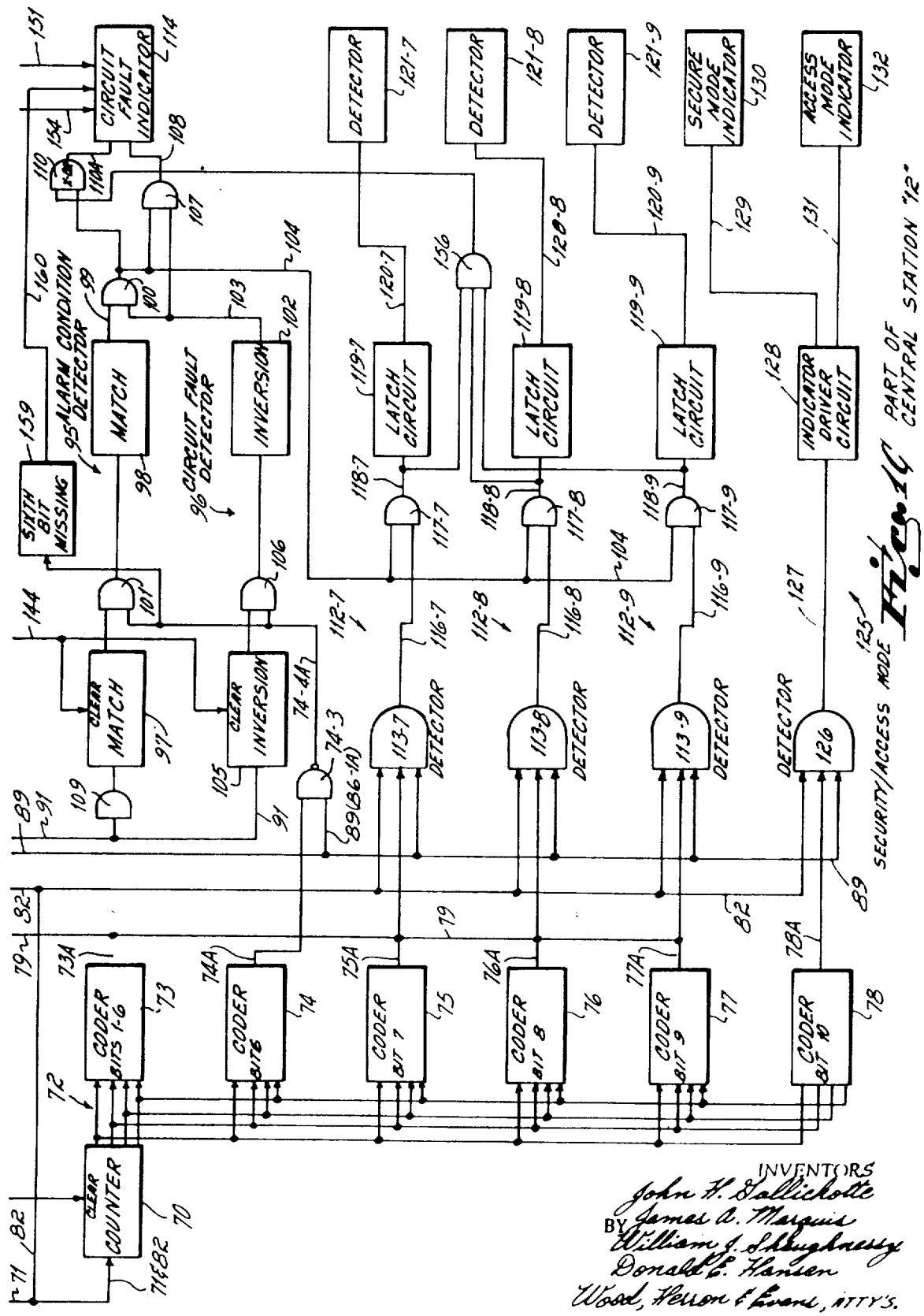

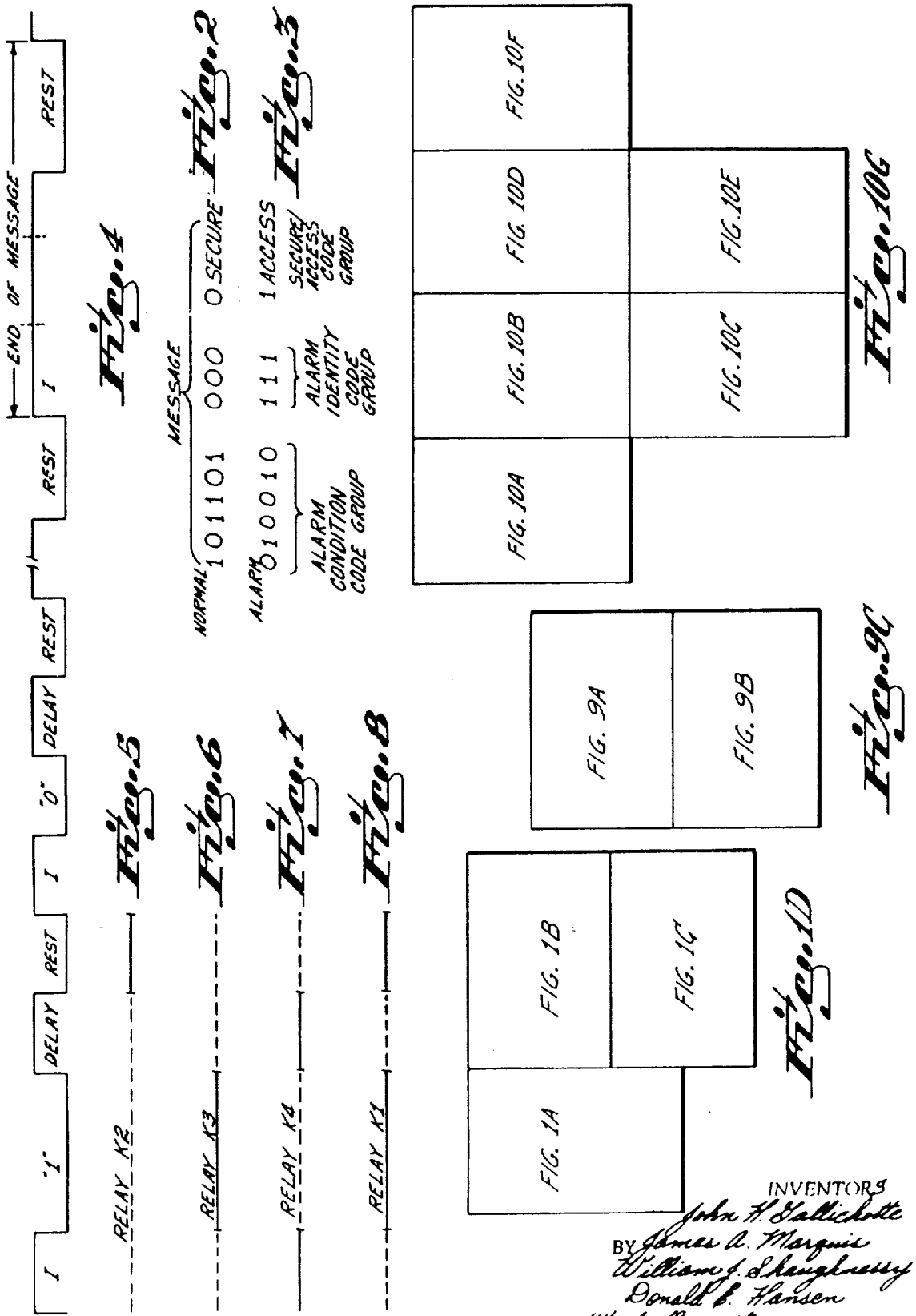

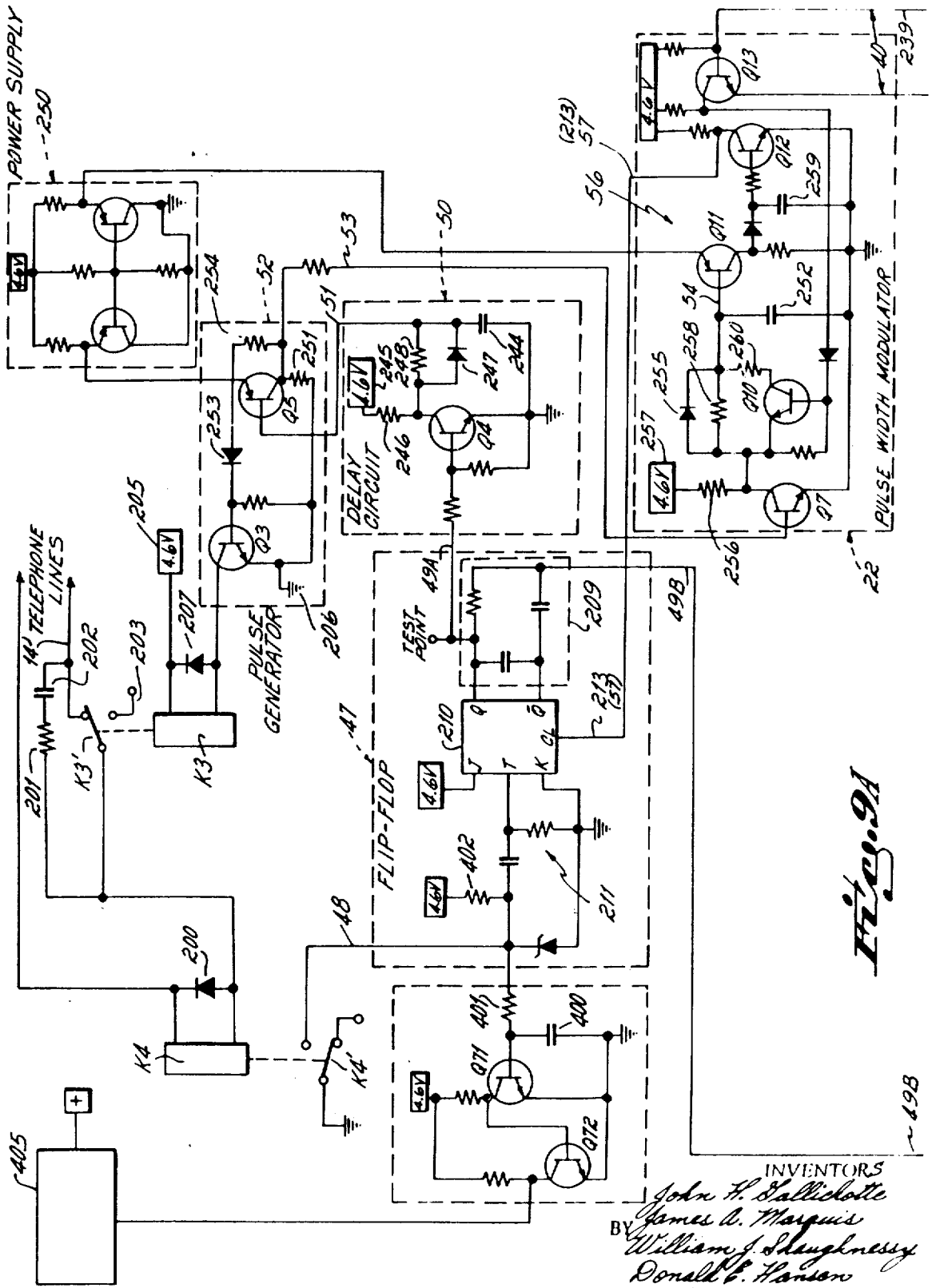

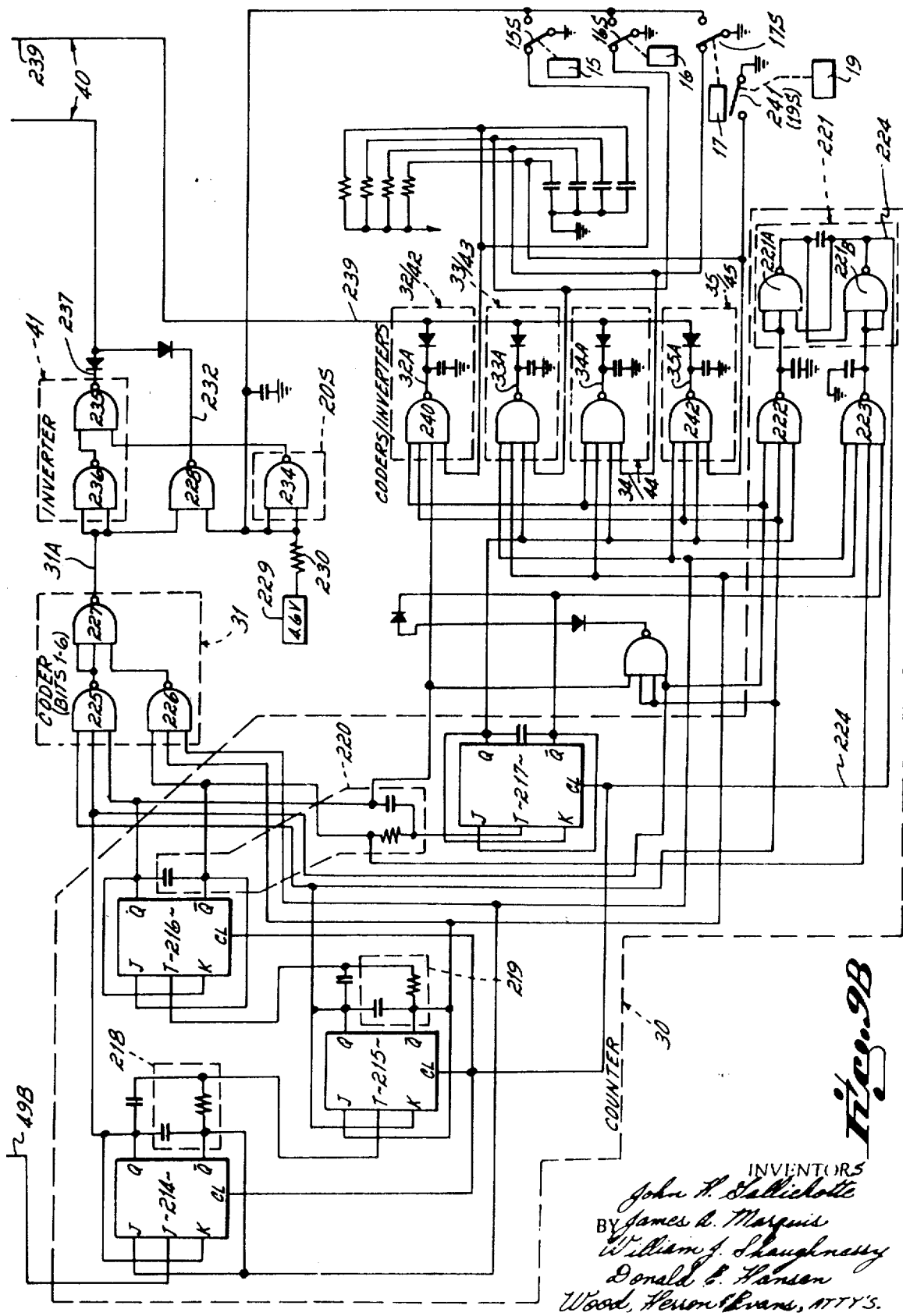

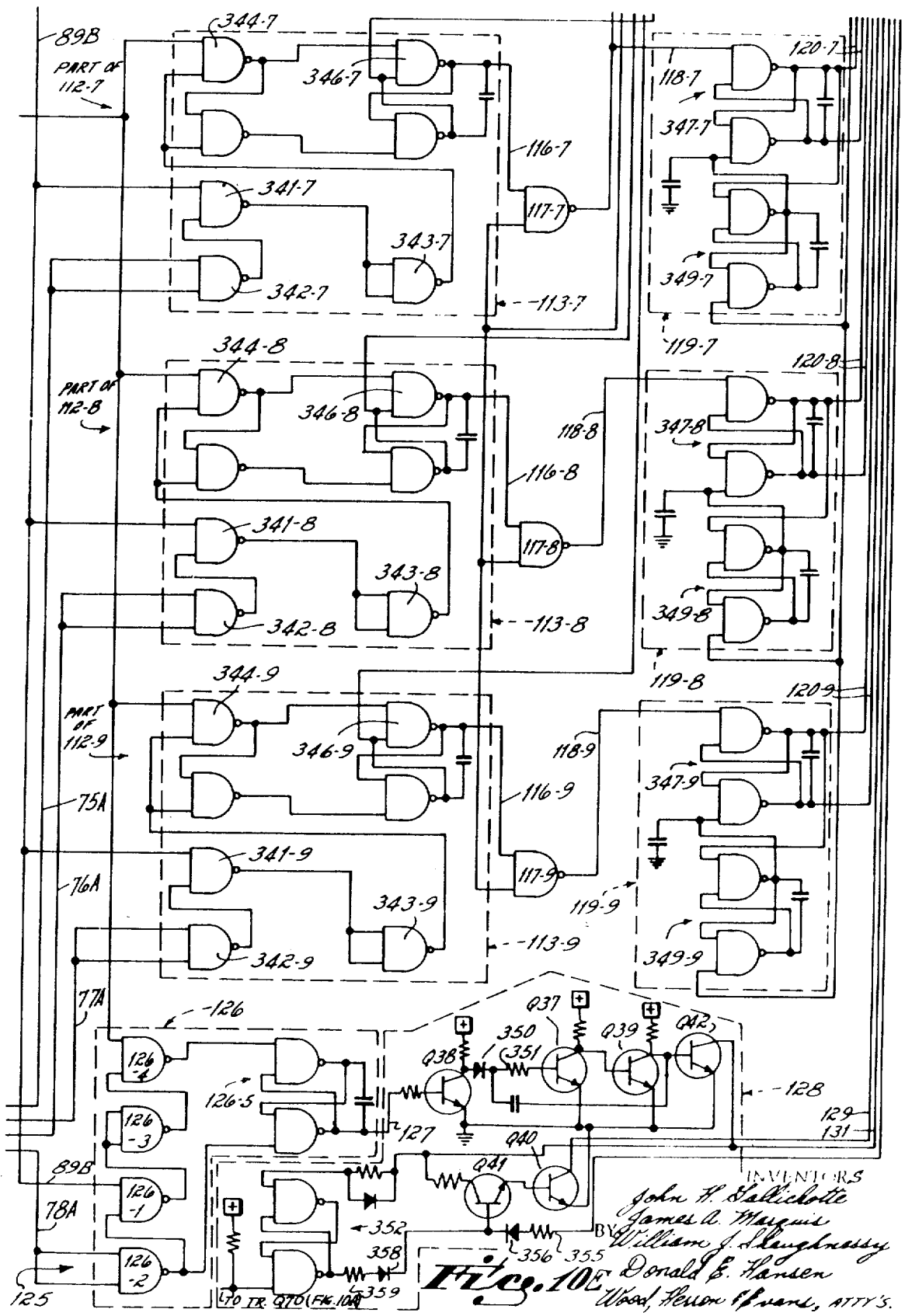

ALARM-MONITORING SYSTEM

This invention relates to an alarm-monitoring system and more particularly to an alarm-monitoring system employing a telephone transmission network for interconnecting a remote station, whereat a plurality of alarm condition sensors which are to be individually monitored are located, and a central station, whereat indications of alarm conditions are to be provided, and over which telephone transmission network signals reflecting the state of the alarm condition sensors are transmitted by the remote station to provide an indication at the central station of the existence of an alarm condition.

The general type of alarm--monitoring system to which the invention relates typically includes a remote station such as a bank or department store, which constitutes the area at which unauthorized, or alarm-type, activity is to be monitored; a central station, for example a police station, at which an indication of unauthorized, or alarm, activity is desired; and a telephone transmission network such as a telephone line or microwave transmission link which connects the remote and central stations and over which signals are transmitted to provide the central station with an indication of remote station alarm activity. The remote station has a varying number of alarm condition sensors, such as thermally responsive devices for sensing fires, motion detectors for sensing intrusions, and the like which are activated in response to sensing their respective alarm conditions, such as fires, intrusions, etc. Cooperating with the alarm condition sensors of the remote station is a transmitting device which transmits to the central station suitable signals when an alarm condition sensor is activated in response to the occurrence of its respective alarm condition.

The central station has appropriate indicating devices for indicating at any given time the states of the various remote station alarm condition sensors. Cooperating with the central station indicators is a detector which analyzes the signals transmitted from the remote station and activates the appropriate indicating device when the transmission reflects the fact that a particular remote station sensor has been activated.

An essential requirement of any alarm-monitoring system of the type indicated is that it be as inexpensive and simple as possible consistent with not being easily defeated or compromised. For a variety of unlawful purposes, people often engage in unauthorized activity at a remote-protected area, and obviously attempt to do so without detection by personnel monitoring the central station alarm-indicating equipment. If the alarm-monitoring system, particularly the remote station alarm condition sensors and the associated signal transmitter, are permitted to operate properly and in their contemplated fashion, the unauthorized activity is detected and a signal transmitted to the central station reflecting the existence of an alarm condition.

One seeking to engage in unauthorized activity without detection has the choice of either disabling the alarm condition sensor, such as a motion detector, with the result that the remote station alarm condition sensor never responds to the unauthorized activity, or manipulate the remote station transmitter such that even though the remote station alarm condition sensor detects the unauthorized activity, a normal or nonalarm signal is transmitted. Since most alarm condition sensors are inside the area to be protected, and normally cannot be disabled without activating them and as a consequence transmitting an appropriate signal to alert central station personnel, those seeking to engage in unauthorized activity without detection most often attempt to manipulate the signal transmission rather than the sensors. This permits them to engage in unauthorized activity at the protected area, activating one or more alarm condition sensors, but yet go undetected at the central station.

One of the forms of transmission manipulation is that which involves monitoring, over a period of time, the signals transmitted from the remote station when unauthorized activity of the type adapted activate the alarm condition sensors is not occurring. By virtue of such signal transmission monitoring, it is possible to determine the normal or nonalarm signal format, and using appropriate techniques synthesize such signal format for transmission when unauthorized activity is in progress, thereby effectively camouflaging the unauthorized activity.

It has been an objective of this invention to provide an alarm-monitoring system which is relatively simple and inexpensive and yet very difficult to compromise or defeat by signal analysis and synthesis techniques. This objective has been accomplished in accordance with certain of the principles of this invention by providing at the remote station a transmitter which transmits a sequence of width-modulated binary signals under normal nonalarm conditions and a complete inversion thereof under alarm conditions, and providing at the central station interrogation means which interrogates the remote station transmitter at least at the rate of one interrogation signal per transmitted width-modulated binary signal. Such a monitoring system is effectively asynchronous in nature, rendering defeat or compromise of the system by signal synthesis, made possible as a consequence of transmission monitoring, very difficult.

In accordance with a preferred embodiment of the system designed to provide a particularly high degree of resistance to defeat or compromise by signal analysis and synthesis techniques, the duration or interval between the initiation of transmission of successive binary signal transmissions is randomized, for example, by randomly varying the interval between receipt of a transmitted bit at the central station and initiation of the bit interrogation signal. By virtue of this randomization, bit transmission by the remote station occurs at randomly varying intervals, thereby making the bit transmission process aperiodic in nature. In the preferred system wherein initiation of interrogation occurs at random intervals following receipt of transmitted bits, the transmitter at the remote station is not a free-running transmitter, but rather is randomly, or periodically, keyed on a bit-by-bit basis by successive randomly, or aperiodically, occurring interrogation signals from the central station. A potential attacker cannot, therefore, defeat or compromise the system by simply applying to the transmission line or network a coded sequence of voltage or current signals identical to that obtained by monitoring a previous transmission and synthesizing that which was monitored.

Another important advantage of the system of this invention is that since pulse-width modulation is used there is always a positive response from the remote station regardless of whether the transmitted bit is a "1" or a "0." The system is, therefore, insensitive to propagation delays and the information rate remains at a maximum. The remote station initiates and terminates the response upon receipt of an interrogation signal, the duration of the response determining whether a logical "1" or a logical "0" is to be transmitted. At the central station, once the beginning of the response is received it is only necessary to sample the response at a point in time greater than the width of a logical "0" and less than the width of a logical "1" to determine whether a logical "0" or a logical "1" was transmitted.

In contrast, in other systems wherein the presence or absence of a response is used to indicate the binary nature of the transmitted signal, it is necessary to wait a greater period to determine whether the response is a logical "0" or a logical "1." The waiting period in such systems begins at the start of the interrogation signal and includes at least two variable transmission line delays. Because of the need to include in the waiting period the transmission delays, the information rate is reduced. Thus, the system, by using pulse-width modulation which makes it insensitive to propagation or transmission line delays, has a greater information rate than comparable systems not using pulse-width modulation.

In a preferred embodiment of the invention, wherein it is desirable to individually monitor the condition of each of a plurality of alarm condition sensors, the remote station transmitting means is adapted to transmit a first width-modulated binary signal sequence or an inversion thereof depending on whether or not none or at least one of the alarm condition sensors has been activated, and a second width-modulated binary signal sequence having as many signals as there are signal devices being individually monitored, the second binary signal sequence being transmitted in a normal form in the absence of an activated alarm condition sensor and with inversion of a sensor-associated signal upon activation of the associated sensor. In accordance with this embodiment, if no alarm condition exists at the remote station, the first and second binary signal sequences are transmitted without inversion, whereas if an alarm condition does exist, the first signal sequence is completely inverted as well as that binary signal of the second signal sequence associated with the activated sensor. By virtue of this embodiment, wherein a second signal sequence is used having as many signals as there are alarm condition sensors individually monitored it is possible to extend the advantages of a single-sensor system to a system having a multiplicity of sensors and yet increase the complexity of the system only to the extent needed to process an additional binary signal for each alarm condition sensor being added.

Furthermore, by requiring inversion of all bits of the first signal sequence as well as inversion of one bit of the second signal sequence, it is possible to detect a number of circuit fault conditions which otherwise would go undetected. For example, it is possible to detect the inversion of a sensor-associated bit if the second signal train unaccompanied b a complete inversion of the first signal sequence, or vice versa, as well as detect inversion of at least one but less than all of the signals of the first sequence. Detection of any one of these three partial inversion conditions, which indicate the existence of a circuit fault condition, require little in the way of circuitry in addition to that already needed to detect complete inversion of the first signal sequence and inversion of a sensor-associated binary signal of the second signal sequence.

To facilitate synchronization of the remote station transmitter and central station signal analyzer on a signal train by signal train basis, binary counters are provided at the remote and central stations for effecting the code transmitting and analyzing functions. The binary counter at the remote station is incremented each time an interrogation signal is received, being reset upon receipt of the interrogation signal following transmission of the last signal train bit and not effective to again transmit the first bit of the signal train until the next interrogation signal is received. The counter at the central station is incremented in response to the transmission of the interrogation signal, but is automatically reset when an interrogation signal fails to produce a response. Thus, the interrogation signal following transmission and receipt of the last bit of a signal train is effective to both directly reset the remote station counter, as well as directly reset the central station counter, insuring synchronization between the counters on a signal train by signal train basis. Should the counters become unsynchronized due to a temporary malfunction or receipt of a spurious signal, the unsynchronized condition can only exist for a single signal train transmission cycle.

The use of counters at the remote and central stations for generating the bits to be transmitted and analyzing the transmitted bits, in addition to facilitating counter synchronization on a signal train by signal train basis, is also valuable by virtue of the ease with which it permits the counters to be modified to transmit and analyze different binary signal sequences. Specifically, it is only necessary to alter in a similar manner the connection of the counter outputs at the respective stations to alter the bit composition of the transmitted signal train and facilitate analysis of the altered train upon receipt thereof at the central station. Since, for security reasons, it is often desirable to change the composition of the signal trains, it is advantageous to have a system which permits such changes to be easily made.

These and other advantages and objectives of this invention will become more readily apparent from a detailed discussion of a preferred embodiment of the invention taken in conjunction with a description of the drawings in which:

FIG. 1A is a schematic circuit, in block diagram format, of the remote station;

FIGS. 1B and 1C are collectively a schematic circuit, in block diagram format, of the central station;

FIG. 1D is a layout depicting the relationship of FIGS. 1A-1C;

FIG. 2 is an illustrative example of a normal binary signal sequence;

FIG. 3 is an illustrative example of an alarm condition signal sequence;

FIG. 4 is a plot of the energization state versus time of the transmission line for two successive bit transmission cycles in which a logical "1" signal and a logical "0" signal, respectively, are transmitted;

FIGS. 5-8 are plots of energization versus time for relays K2, K3, K4 and K1, respectively, during transmission of a logical "1";

FIGS. 9A and 9B are collectively a detailed circuit diagram of a preferred embodiment of the remote station;

FIG. 9C is a layout depicting the relationship of FIGS. 9A and 9B;

FIGS. 10A-10F are collectively a detailed circuit diagram of a preferred embodiment of the central station.

FIG. 11 is a schematic circuit diagram of a modified transmission system which facilitates changing the transmitted message from the central station.

Figure 10A:
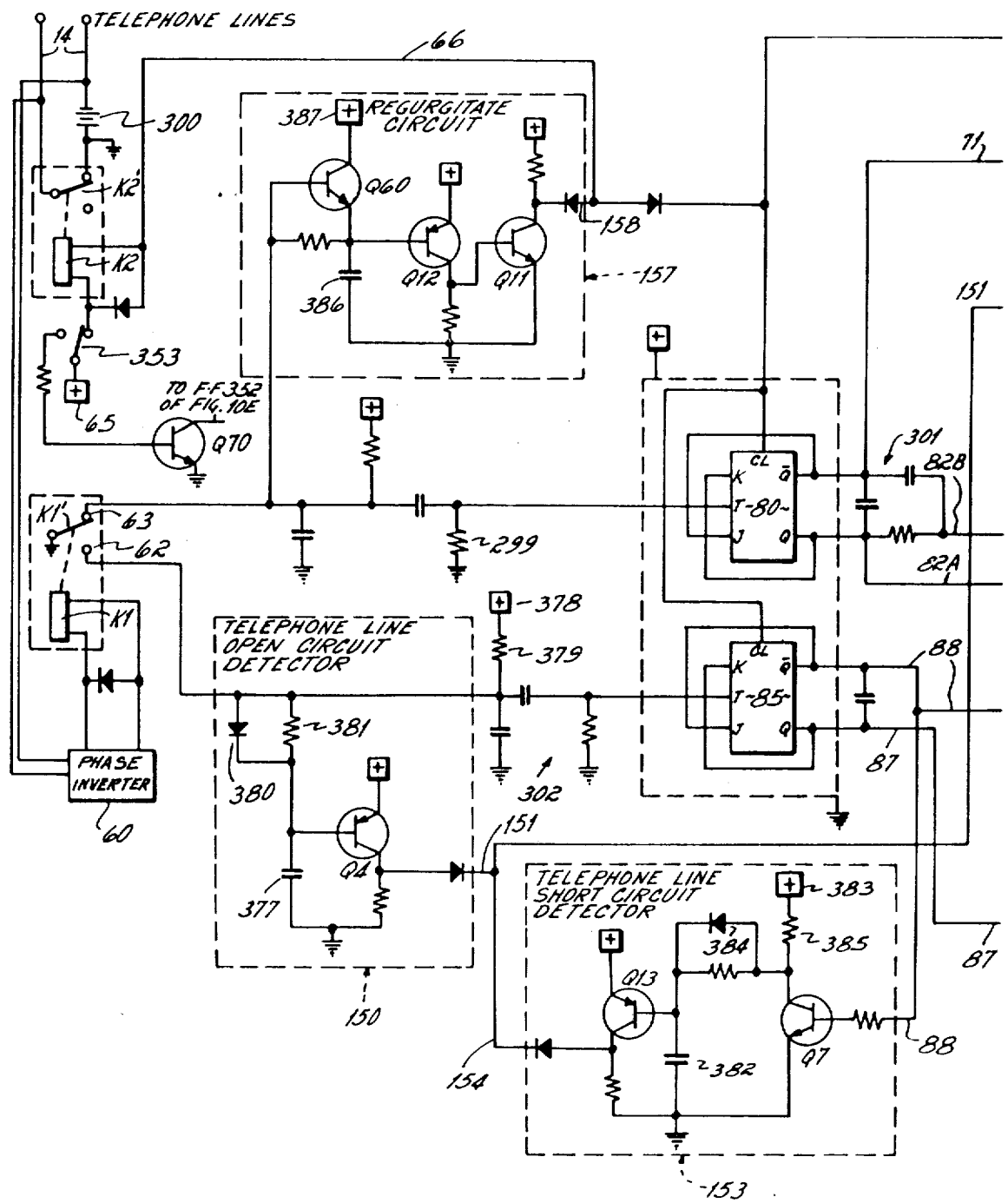

The alarm-monitoring system of this invention, as shown best on FIGS. 1A-1C includes a remote station 10 (FIG. 1A) and a central station 12 (FIGS. 1B and 1C) which are interconnected by suitable transmission means, for example, a telephone line 14. The remote station 10 is provided with at least one, and preferably a group of alarm condition sensors or detectors 15, 16, and 17. The alarm condition detectors or sensors 15–17 are designed to sense alarm conditions of the type for which they are particularly adapted, and upon sensing an alarm close their respectively associated switches 15S–17S and a common switch 20S. The detectors 15–17 may be of the type adapted to sense movement in a restricted area, opening of a secured door or window, vibration, heat, interruption of a light beam of the like. The sensors 15–17 may each take the same form such as motion detectors located in different rooms of a building or buildings of a multibuilding complex, or alternatively one or more of the sensors may be different in form. Illustrative of the latter arrangement is the use of a motion detector in the public area of a bank, a vibration detector in the bank vault, and a light beam-photocell arrangement at the bank entrance.

To facilitate unrestricted use without activating an alarm of a protected area having located therein alarm condition detectors 15–17, such as is desirable during the day when the protected area is, for example, a bank or department store, suitable means (not shown) are provided for disabling the detectors 15–17. The alarm condition detector-disabling means is under the control of authorized personnel at the protected area, such as the bank or store manger, and is selectively operable to either disable or enable the detectors. When the detectors 15–17 are disabled and enabled, the system is what is termed herein the "access" and "secure" modes, respectively. The detector disable/enable means constitutes no part of this invention, but rather is a conventional technique currently in use and well within the ordinary skill of one in the art.

To facilitate monitoring the condition, alarm or nonalarm, of the alarm condition detectors 15–17, a message transmitter operable in response to randomized interrogation by the central station and dependent on its information content on the condition of the detectors, is provided at the remote station, and a remote station randomized interrogating and message receiving and monitoring circuit is provided at the central station. The message which the remote station transmits consists of a train of 10 binary digits or bits, which are divided into three different groups, or signal sequences, differing from each other from the standpoint of their information-conveying function (FIGS. 2 and 3). The first group of message bits is six bits in length and functions to indicate either the presence or absence of an alarm condition at the remote station and is herein termed the "alarm condition code group." The bits of the alarm condition code group are designed to have a normal form in the absence of an alarm condition (FIG. 2), or alternatively a totally inverted form in the presence of an alarm condition (FIG. 3). Under normal nonalarm conditions, the alarm condition code group may comprise for example, the bit train 101101 (FIG. 2). Under alarm conditions this group would comprise the totally inverted bit train 010010 (FIG. 3).

The second group of message bits comprise as many bits as there are alarm condition detectors at the remote station 10. In the preferred embodiment there are three alarm condition detectors 15–17, and therefore there are three bits in the second message bit group (FIGS. 2 and 3). The second message bit group is termed herein the "alarm identity code group." Each of the three bits of the alarm identity code group is associated with a different one of the alarm condition detectors 15–17, and is a "0" if its respective alarm detector is in the normal or nonalarm state (FIG. 2) or a "1" if its respective alarm detector is in the abnormal or alarm state (FIG. 3).

The third message bit group comprises a single bit. This bit group, herein termed the "secure/access code group," functions to indicate whether the alarm condition detectors at the remote station are in their enabled or disabled condition placing the system in the secure or access modes, respectively. The secure/access code group contains a "0" bit (FIG. 2) if the system is in the secure condition with the alarm condition detectors 15–17 enabled, or a "1" bit (FIG. 3) if the system is in the access mode with the alarm condition detectors disabled.

It is important it note at this point that in accordance with this invention the bit composition of the alarm condition code group is relatively unique for any given remote station in that for an n-bit code there exist $2^n$ possible code groups, each of which are different and potentially available as an alarm condition code group. Stated differently, and so long as there are not more remote stations than different code group permutations, the alarm condition code group associated with a first remote station, such as a bank, is different from the alarm condition code group of a second remote station, such as a department store or another bank. This uniqueness of the alarm condition code groups for different remote stations prevents a person familiar with the alarm condition code group of one remote station, such as a bank where the person is employed, from using this knowledge to defeat or compromise an alarm-monitoring system associated with a second and different remote station, such as another bank. Thus, the terminal unit or message transmitter used at a first remote station cannot be successfully used by random substitution to defeat or comprise the alarm-monitoring system associated with a second and different remote station.

As noted previously, monitoring of the condition of the alarm condition detectors 15–17 at the remote station is accomplished by remote station transmission of the 10-bit coded message, transmission of the message being in response to randomized interrogation by the central station, and subsequent central station analysis of the received message. Specifically, each bit of the 10-bit message is transmitted in response to a separate, randomly occurring interrogation signal from the central station. This randomized interrogation signal-bit transmission combination gives the alarm-monitoring system of this invention the characteristics of an asynchronous and aperiodic transponding system, that is, the message generated at the remote station is not free running, but rather is accomplished on a bit-by-bit basis in response to successive randomly occurring interrogations by the central station. The asynchronous and aperiodic transponding nature of the system makes compromise or defeat more difficult since an attacker cannot defeat the system by simply applying and identical coded sequence of voltage or current pulses, obtained by transmission monitoring, to the telephone line which interconnects the remote and central stations.

A further characteristic of message transmission by the remote station is that pulse-width modulation techniques are employed for bit transmission. One specified length pulse is used in transmitting logical "0's" and a second and different specified length pulse is used to transmit logical "1's" (FIG. 4). Thus, regardless of whether a "0" or a "1" is being transmitted a positive response is always obtained from the remote station. This is in contrast to other systems in which the presence or absence of a response from the remote station is used to indicate the logic level of the bit. In such systems the remote station must wait a relatively long and arbitrary time to determine whether a response is forthcoming. This waiting period must begin at the start or the beginning of the interrogation signal and account for two variable transmission line delays. Because of these variable delays, the information rate, that is the number of information-conveying bits transmitted per unit time, is reduced. In the system of this invention wherein pulse-width modulation is utilized to provide a positive response regardless of the logic level of the bit, waiting periods to determine the absence of a response are not required, and hence the information rate is not degraded. In addition, the system is insensitive to propagation delays.

The remote station 10 includes a relay K4 and a relay K3, and associated contacts K4' and K3'. The relay K4 is connected in series with the telephone line 14 and adapted to be energized (FIG. 7) to close its normally open contact K4' when the telephone line is energized, which occurs in a manner to be described, when an interrogation pulse is received from the central station. When energized in response to an interrogation pulse the relay K4 and its contact K4' function to initiate, after a suitable delay of approximately 60 milliseconds, transmission of a message bit. The 60-msec. delay between receipt of the interrogation pulse and start of transmission is necessary to keep the transmission rate below 20 Baud to comply with telephone company tariff regulations on transmission rates. Relay K3 and its contact K3' function to interrupt the electrical continuity of the telephone line 14 for period of either 60msec. or 140 msec. depending upon whether a logical "0" or a logical "1" bit is to be transmitted in response to the interrogation signal (FIG. 6).

A counter 3, which is pulsed each time an interrogation signal is received, cooperates with five coders 31–35, each of which have their inputs connected to the counter outputs. The combination of the counter 30 and the coders 31–35 provides, on coder output lines 31A–35A, and on a sequential basis, the various bits of the 10-bit message. Specifically, coder output line 31A provides the normal or nonalarm form of the six-bit alarm condition code group. The coders 32, 33, and 34 provide on their respective output lines 32A, 33A, and 34A, and on a sequential basis, the normal or nonalarm form of the alarm identity bits, namely, the bits 0, 0, 0, associated with the detectors 15, 16, and 17. The coder 35 provides on its output line 35A a logical "0" corresponding to the secure mode of operation.

The normal or nonalarm form of the alarm condition code group present on coder output line 31A, the normal nonalarm form of the alarm identity code group present on coder output lines 32A–34A, and the normal secure/access mode group on output line 35A can be inverted to represent the existence of an alarm condition, the identity of the particular alarm condition detector 15–17 activated, and the operation of the system in the access mode, respectively, by switching the position of switches 20S, 15S–17S, and 19S, respectively. With the alarm condition code group switch 20S in the position opposite to that shown in FIG. 1A the normal alarm condition code group, 101101, present on line 31A is passed through an inverter 41, and output on a common data line 40 in its inverted form 010010, indicating one of the detectors 15–17 is in an alarm condition. With any one of switches 15S, 16S, and 17S in a position opposite to that shown in FIG. 1A, the normal "0" bit present on its associated line 32A, 33A, and 34A is passed through an inverter 42, 43, or 44 providing on the common data line 40 a logical "1" bit indicating the particular detector 15–17 in the alarm condition. With switch 19S in the position opposite to that shown in FIG. 1A, the logical "0 bit output on line 35A designating the secure mode is passed through inverter 45 applying a logical "1" to the common data line 40 indicating that alarm condition detectors 15, 16, and 17 are in the disabled condition placing the system in the access mode.

Since the alarm condition code group is unique for each remote station, that is, different for different remote stations, the coder 31 operates on the outputs of the counter 30 differently for different remote stations. Modifications of the manner in which the coder 31 operates on the outputs of the counter 30 to produce different alarm condition code groups is accomplished easily by merely changing the manner in which the outputs of the counter stages are interconnected to the coder 31. The mode of operation of the counter 30 need not be different for each remote station, different alarm condition code groups being obtained by merely altering the coder-counter interconnection.

To facilitate response by the remote station 10 to an interrogation signal on the telephone line 14, a flip-flop 47 is provided. The flip-flop 47 has an input line 48 which is grounded upon closure of relay contact K4' when the relay K4 is energized by the interrogation signal which energizes the telephone line (FIGS. 4 and 7). Grounding of the flip-flop 47 input line 48, as a consequence of the interrogation signal, sets the flip-flop, producing an output on line 49. The output signal on line 49 has a twofold purpose. First, it advances the counter 30 making available for transmission, via the common data line 40, the next bit of the message. Secondly, setting of the flip-flop 47 in response to receipt of the interrogation signal provides an input on line 49 to a delay circuit 50, the time delay of which is equal to the desired duration of the interrogation signal.

Responsive to the output on line 51 of the delay circuit 50 is a pulse generator 52. The pulse generator 52, following a predetermined interval from the receipt of the interrogation pulse as determined by the delay circuit 50, and herein named the interrogation period, initiates a pulse which is output on line 53. The pulse output on line 53 of the pulse generator 52, in turn, is input to the pulse-width modulator 22. Depending upon whether a logical "0" or a logical "1" is present on the common data line 40, the pulse output on line 53 of the pulse generator 52 is either a pulse of 60-msec. length corresponding to a logical "0" or a pulse of 140-msec. length corresponding to a logical "1." The width-modulated pulse output on line 54 from the pulse-width modulator 22 energizes the relay K3 (FIG. 6), opening the normally closed relay contact K3' to interrupt the telephone line 14 (FIG. 4). Thus, the beginning of the width-modulated pulse on line 54, which follows the receipt of the interrogation signal by a time period equal to the delay of the delay circuit 50, constitutes the termination of the interrogation signal and the beginning of the response of the remote station to the interrogation signal. The relay K3 remains energized with its normally closed contact K3' in the open state, interrupting the telephone line 14, for a period equal to the length of the width-modulated pulse present on line 54, herein termed the response period. When the pulse on line 54 terminates, relay K3 is deenergized and the relay contact K3' returns to its normally closed condition completing the telephone line circuit. Thus, relay contact K3' is in its open condition interrupting the telephone line for a period equal to the length of the width-modulated pulse which can either by 60 msec. or 140 msec. depending upon whether a logical "0" or a logical "1" is input to the pulse width modulator 22 on the common data line 40.

An end of pulse detector 56 having its input responsive to the width-modulated pulses on line 54 is provided to generate a reset signal upon completion of transmission of a message bit. The reset signal generated by the end of pulse detector 56 is input to the clear terminal of the flip-flop 47 on line 57. The reset signal on line 57 functions to reset the flip-flop 47 such that it is in a condition to be set to step the counter and activate the delay circuit 50 prior to transmitting the next response when the next successive interrogation signal is received at the remote station. Since relay K4 is again energized upon closing of contact K3' at the end of transmission of the width-modulated message bit, the reset signal on line 57 which occurs at the end of transmission of the width-modulated pulse must be long enough to extend beyond the time of closure of contact K4'. If this is not so, when relay contact K4' closes upon reenergization of relay K4 at the end of the width-modulated bit transmission, flip-flop 47 would be set and initiate a response prior to receipt of the next interrogation signal.

The central station 12 includes two relays K1 and K2. Relay K1 is connected to the telephone lines 14 through a phase inverter 60 such that relay K1 is energized and deenergized when the telephone lines are incomplete or deenergized and complete or energized, respectively. A battery 300 or other DC source is connected in series with one of the telephone lines 14 to facilitate energization of the telephone lines. The relay K1 has a contact K1' which, when the relay is energized and deenergized, alternatively grounds terminals 62 and 63, respectively, corresponding to periods of telephone line interruption and telephone line completion, respectively (FIGS. 4 and 8). Relay K2 has a normally closed contact K2' which is connected in series in the telephone line. The relay K2 is connected between a source of positive potential 65 and a line 66 responsive to an output of a NAND gate 67 of a rest period circuit 69. The NAND gate 67, in cooperation with a delay circuit 64 which is also part of the delay period timer circuit 68, functions to maintain he relay K2 deenergized and the contact K2' closed, completing the telephone line, for a predetermined interval after receipt of a complete message bit, which period herein is called the delay period, as well as maintain the relay K2 energized and its contact K2' open to interrupt the line for a second random length interval, following termination of the delay period, herein called the rest period. Preferably the delay period and rest period exceed 50 msec., for example, the delay period being approximately 83 msec. and the rest period being approximately 60 msec.–120 msec., to comply with telephone company tariff regulations limiting transmission rates to 20 Baud and accommodate certain timing circuit tolerances and provide the desired randomness between the initiation of successive bit transmissions.

The central station 12 includes a counter 70 which is similar in construction to the counter 30 of the remote station 10. The counter 70 is stepped or advanced by a signal on its input line 71 each time an interrogation signal is transmitted from the central station. Associated with the counter 70 and responsive to its outputs on lines 72 are a plurality of coder circuits 73, 74, 75, 76, 77 and 78. The coder circuit 73, in cooperation with the counter 70, successively generates on its output line 73A the six bits of the alarm condition code group transmitted by the remote station under normal or nonalarm conditions. Thus, on line 73A appears the pulse train 101101 corresponding to the normal alarm condition code group. In a manner to become apparent hereafter, this output on line 73A is compared with he six-bit alarm condition code group actually received from the remote station to ascertain the existence or nonexistence of an alarm condition at the remote station. T six bits successively generated on coder output line 73A are in synchronization with the receipt of the six bits of the alarm condition code group transmitted by the remote station 10.

The coders 74 and 78 provide on their respective output lines 74A and 78A synchronization, or timing, signals upon receipt of the sixth last bit of the alarm condition code group transmitted by the remote station and the 10th and last bit of the message corresponding to the secure/access code group transmitted by the remote station respectively. The coders 75, 76, and 77 provide on their respective output lines 75A, 76A and 77A logical "0's" which correspond to the normal bits of the alarm identity code group transmitted by the remote station. These central-station-generated bits are generated in synchronism with the receipt from the remote station of their associated alarm identity code group bits.

To advance the counter 70 upon initiation of an interrogation transmitted to the remote station, a flip-flop 80 is provided. The flip-flop 80 is responsive to terminal 63 which is selectively grounded, setting the flip-flop when relay K1 is deenergized upon completion of the telephone lines 14 at the beginning of the interrogation pulse. Thus, the flip-flop 80 provides on its output lines 71 and 82 complementary signals when the flip-flop is set in response to initiation of the interrogation signal. One of these signals is input to the counter on line 71, advancing the counter and thereby internally generates at the central station the next bit of the message or timing signal, as the case may be.

To demodulate or decode the width-modulated pulses received from the remote station 10 on the telephone line 14 a second flip-flop 85 and a data-sampling pulse generator 86 are provided. The input of the flip-flop 85 is responsive to terminal 62 which is grounded by the relay contact K1' when the relay K1 is energized coincident with opening of the telephone line by the remote station at the beginning of the transmission of a message bit. Grounding of terminal 62 at the beginning of the response period sets the flip-flop 85, producing complementary outputs on the flip-flop output lines 87 and 88. The output from the flip-flop 85, coincident with the beginning of the response period is input to the data-sampling pulse generator 86. The data-sampling pulse generator 86, in response to this input, provides a sampling pulse of approximately 1 msec. duration on its output line 89 at a point in time 103 msec. after the starting point or leading edge of the received message bit transmitted from the remote station. The data-sampling output pulse on line 89 is used to sample the output on line 82 from flip-flop 80 to determine whether a 140-msec. pulse corresponding to a logical "1" or a 60-msec. pulse corresponding to a logical "0" has been received. As indicated previously, the flip-flop 80 is set when its input, terminal 63, is grounded by deenergization of relay K1 when the telephone lines close at the beginning of the interrogation period. The flip-flop 80 is reset at the end of a response period, that is, upon completion of the transmission of the message bit since its input, terminal 63, is again grounded by the deenergization of relay K1 in response to closing of the telephone lines at the remote station. Thus, the flip-flop 80 is reset at a point in time corresponding to receipt of the trailing edge of the transmitted message bit. Since the data-sampling pulse generator 86 produces the data-sampling pulse on line 89, 103 msec. after the leading edge of the transmitted data bit has been received, by sampling the state of the flip-flop 80 it is possible to determine whether a logical "0" or a logical "1" has been transmitted. If the flip-flop 80 is still in the set condition indicating that the trailing edge of the transmitted pulse has not yet been received, then the transmitted pulse is 140 msec. long and deemed a logical "1." If the flip-flop 80 has been reset by receipt of the trailing edge of the transmitted bit, upon sampling of the flip-flop output 80 by the sampling pulse on line 89, it is possible to determine that a short-duration pulse of 60 msec. corresponding to a logical "0" has been transmitted.

A comparator 90 is provided in order to ascertain whether the transmitted message bits of the alarm condition code group corresponds to the normal or nonalarm bit, or to an inversion thereof corresponding to an alarm condition. The comparator 90 is responsive to the normal bits of the alarm condition code group generated at the central station by the counter 70 and the coder 73 which are present on the common coder output line 79. The comparator 90 is also responsive to the output on line 82 of the flip-flop 80 which represents the received message bit. The comparator 90 is also responsive to the data-sampling pulse generator output on line 89. In response to these outputs on lines 79, 82, and 89, the comparator produces on its output line 91 a signal each time a received message bit does not match the corresponding bit internally generated by the counter 70 and the coder 73. Thus, on line 91 a mismatch signal is produced each time a bit of the alarm condition code group is inverted at the remote station. If any of of the alarm condition sensors 15–17 has been activated to switch its respective switch 15S–17S and the switch 20S, the bits of the alarm condition code group are inverted producing six sequential mismatch outputs from the comparator 90 on line 91.

Under certain conditions when a circuit fault exists, either at the remote station or the central station, it is possible to have an inversion of one or more, but less than all, of the bits of the alarm condition code group. To distinguish between a complete inversion of all bits of the alarm condition code group which indicates the presence of a true alarm condition at the remote station, and a partial inversion, i.e. inversion of one or more but less than all of the bits, of the alarm condition code group which corresponds to a circuit fault condition, an alarm condition code group inversion detector circuit 95 and a circuit fault detector 96 are provided. The alarm condition code group inversion detector 95 includes a flip-flop 97 which is connected via an inverter 109 to the output line 91 of the comparator 90. By reason of the inverter 109, an input is provided to the flip-flop 97 each time the transmitted bit and the bit internally generated at the central station match, that is, an input is provided to the flip-flop 97 each time a normal, noninverted bit is received. Thus, the flip-flop 97 is set upon receipt of the first noninverted or normal bit. If no noninverted or normal bits are received, the flip-flop 97 remains reset.

Subsequent to receipt of the sixth and last bit of the alarm condition code group, the status of the flip-flop 97, which records received noninverted bits of the alarm condition code group, is sampled by a NAND gate 101 whose one input is responsive to the output of the flip-flop 97 and whose other input is responsive, via NAND gate 74-3, to the output line 74A of coder 74 which produces a signal upon receipt of the sixth and last bit of the alarm condition code group and upon generation of a data-sampling output on line 89 from the data-sampling pulse generator 86. The sampled output of the flip-flop 97 made subsequent to receipt of the six bits of the alarm condition code group is stored in a storage flip-flop 98. On output line 99 of storage flip-flop 98 a logical "0" signal is present if one or more of the transmitted bits of the alarm condition code group are normal or noninverted, and a logical "1" is present if none of the received alarm condition code group bits are normal.

The alarm condition code group inversion detector 95 also includes a NAND gate 100. The NAND gate 100 has one input connected to output line 99 of flip-flop 98 on which a logical "1" signal is present if no normal or noninverted bit of the alarm condition code group has been received. The NAND gate 100 also has one input connected to a flip-flop 102, to be described, on whose output line 103 a logical "1" signal appears if at least one alarm or inverted bit is received. Logical "1" signals are present on both lines 99 and 103 if no normal or noninverted signals have been received and if at least one alarm or inverted signal is received, and are effective to produce a logical "0," output on NAND gate output line 104, indicating that a completely inverted alarm condition code group has been received.

The circuit fault detector 96 includes a flip-flop 105 responsive to the output line 91 of the comparator 90. The flip-flop 105 is set if at least one inverted alarm condition code group bit is received. The contents of flip-flop 105 are gated by a NAND gate 106 upon receipt of an output on line 74-4A of NAND gate 74-3 which occurs when all six bits of the alarm condition code group are received and a data-sampling pulse is generated. The gated output of the flip-flop 105 is input to the flip-flop 102 producing on line 103 a logical "1" signal if at least one inverted or alarm bit is received. The circuit fault detector 96 also includes a NAND gate 107. The NAND gate 107 is connected to the output of the alarm condition code group inversion detector 95 on line 104. A logical "1" signal is input to NAND gate 107 on line 104 if a complete alarm condition code group inversion has not been detected. The NAND gate 107 is also responsive to the output of flip-flop 102 on line 103. The NAND gate 107 produces a logical "0" signal on output line 108 indicating a circuit fault condition when logical "1" signals are input on lines 103 and 104 corresponding to conditions of at least one inverted alarm condition code group bit and the absence of a complete inversion of all alarm condition code group bits. Thus, a logical "0" output signal is provided on line 108 of NAND gate 107 indicating a circuit fault when at least one, but not all, of the six alarm condition code group bits is inverted.

The output on line 108 corresponding to a circuit fault of the type wherein at least one, but less than all, of the bits of the alarm condition code group are inverted is input on line 110A to a circuit fault indicator 114 which functions to provide a visual and/or audible indication to the personnel at the central station.

For the purpose of indicating inversion of one of the alarm identity code group bits when all of the alarm condition code group bits are also inverted, reflecting the existence of an alarm condition at the remote station, alarm identity code group bit inversion detector circuits 112–7, 112–8, and 112–9 are provided. The detector 112–7 includes a NAND gate 113–7 which is responsive to the output line 82 of flip-flop 80 which represents the received message bit, output line 75A of coder 75 on which a signal is produced upon receipt of the seventh message bit, and line 89 on which a data-sampling signal is present. The NAND gate 113–7 provides an output on its output line 116–7 a logical "1" is received as the seventh transmitted message bit, a logical "1" being received when switch 15S is in the position opposite to that shown in FIG. 1A in response to the sensing of an alarm condition by its associated sensor 15. A NAND gate 117–7 is provided and has one input connected to output line 116–7 of NAND Gate 113–7, and another input line connected to output line 104 of NAND gate 100 indicating an inversion of the alarm identity code bit and a complete inversion of the alarm condition code group, respectively. The NAND gate 117–7 provides an output on line 118–7 when a complete inversion of the alarm condition code group is present as well as an inversion of the alarm identity code bit corresponding toe alarm sensor 15 which has been activated. The output on line 118–7 is input to a latch circuit 119–7 which is switched and latched, providing a continuous signal on line 120–7 to a visual and/or audible detector 121–7 to provide an indication that remote station alarm condition sensor 15 has been activated.

Detector circuits 112–8 and 112–9 are identical in structure and operation to detector circuit 112–7 except that detector circuits 112–8 and 112–9 provide indications that remote station alarm condition sensors 16 and 17 have been activated, respectively. Thus, inputs are provided on lines 120–7, 120–8, and 120–9 to indicators 121–7, 121–8, and 121–9 when the seventh, eighth, and ninth message bits, respectively, of the alarm identity code group are inverted indicating the activation of alarm condition sensors 15, 16, and 17, respectively, and the alarm condition code group has been completely inverted. Accordingly, when one of the detectors 121–7, 121–8, or 121–9 has been activated, personnel at the central station are informed that an alarm condition at the remote station exists, as well as the particular one of the alarm condition sensors which has been activated in response to the alarm condition.

To determine whether the system is in the secure or access mode, a secure/access code group bit inversion detector circuit 125 is included. This circuit 125 includes a NAND gate 126 which is responsive to the data-sampling pulse on line 89, the received bit on line 82, and the output of coder 78 on line 78A. NAND Gate 126 produces either a logical "0" or a logical "1" output on line 127 depending upon whether the system is in the secure or access mode. The NAND gate output on line 127 is input to an indicator driver circuit 128. If a logical "0" is input to the driver circuit 128 on line 127, indicating that the 10th message bit transmitted is a "0" and hence that the remote station is in the secure mode, an input is provided on driver output line 129 to a secure mode indicator 130, providing central station personnel with an indication that the system is in the secure mode. If a logical "1" is input to the driver circuit 128 on line 127, indicating that the 10th message bit is a logical "1" and the remote station therefore is in the access mode, an output is provided on driver circuit output line 131 to an access mode indicator 132, providing central station personnel with an indication that the remote station is in the access mode.

To indicate when all 10 bits of the message have been received, an end of message circuit 140 is provided. The end of message circuit 140 includes a delay circuit 141 the input of which is responsive to output line 82 of flip-flop 80. The delay circuit 141 provides on its output line 142 a logical "1" signal at a point in time approximately 320 msec. after the start of the interrogation period. The output on line 142 is input to a NAND gate 143, the other input of which is connected to output line 88 of flip-flop 85. The NAND gate 143 provides on output line 144 a logical "0" reset signal coincident with the generation of the output from delay circuit 141 only when the NAND gate 143 is in the enabled condition by virtue of a logical "1" input thereto on line 88. It will be recalled that an output signal is provided on line 82 which is the input line to the delay circuit 141 upon initiation of the interrogation period. It will be also recalled that a logical "0" output is provided on line 88 upon receipt of a transmitted bit. Thus, if a transmitted bit is received an flip-flop 85 is set, a logical "0" output is present on line 88 which disables NAND gate 143, preventing NAND gate 143 from providing on its output line 144 a reset signal when the delay circuit 141 produces an output on line 142 approximately 320 msec. after the beginning of the interrogation signal as a consequence of having input thereto on line 82 a signal at the beginning of the interrogation period. However, when an interrogation signal is transmitted subsequent to transmission of the 10th message bit and no response from the remote station is forthcoming, the output of the flip-flop 85 is a logical "1" which enables gate 143. Therefore, the output of the delay circuit 141 on line 142 is not blocked, and NAND gate 143 gates the signal on line 142, producing on line 144 the reset signal indicating the end of message. The reset or end of message signal on line 144 functions to reset the flip-flops 97 and 105. Additionally, the reset signal on line 144 activates the delay period circuit 68, and in turn the rest period circuit 69 which via NAND gate 67 produces the necessary signals on line 66 to institute the delay and rest periods following the interrogation period succeeding receipt of the last message bit. The reset output on line 144 also resets the counter 70, ensuring synchronism between the central station counter 70 and the remote station counter 30 which was reset upon receipt of the interrogation signal succeeding the transmission of the last message bit.

A telephone line open-circuit detector 150 responsive to terminal 62 is provided. The telephone line open circuit detector 150 provides an output on line 151 to the circuit fault indicator 113 when the telephone line remains in a deenergized condition for an excessively long interval.

A telephone line short circuit detector 153 responsive to output line 88 of the flip-flop 85 is provided to generate a signal on its output line 154 to the circuit fault indicator 113 when the telephone line remains in an energized condition for an excessively long interval.

A regurgitate circuit 157 responsive to terminal 63 is provided for momentarily interrupting the telephone lines should the telephone lines remain energized for an excessive interval. Thus, should the system stall with the telephone lines energized, the regurgitate circuit 157 produces on its output line 158 a signal which momentarily energizes the relay K2 to interrupt the telephone line.

A sixth bit missing circuit 159 adapted to detect the absence of the sixth message bit is also provided. This circuit provides on its output line 160 a signal to the circuit fault indicator 114 should the sixth bit of a message be missing.

DETAILED DESCRIPTION OF REMOTE STATION CIRCUIT

A detailed circuit diagram of a preferred embodiment of the remote station 10 is depicted in FIGS. 9A and 9B. As shown in these figures the remote station includes the transmission line 14 and associated relays K3 and K4. The relay K4 is connected in the transmission line in parallel with a normally reverse biased diode 200. The relay K4 has a grounded contact K4' alternately connectable between a floating potential terminal 203 and the line 48. When the transmission line is deenergized, the relay K4 is deenergized and the relay contact K4' is in the solid line position shown in FIG. 9A. When the transmission line is energized, energizing the relay K4, the relay contact K4' moves to the dotted-line position shown in FIG. 9A.

The relay K3 is connected between a source of positive potential 205 and ground potential 206 via the emitter-collector path of a normally nonconducting transistor switch Q3. A normally reverse biased diode 207 is connected in parallel with the relay K3. The relay K3 has a contact K3' which is connected in the transmission line. The relay K3 is normally deenergized, and when deenergized has its contact K3' in the solid-line position shown in FIG. 9A in which the transmission line circuit is complete. When the relay K3 is energized, the contact K3' moves to the dotted line position shown in FIG. 9A, interrupting the electrical continuity of the transmission line. A resistor 201 and capacitor 202 are connected in parallel with the relay contact K3' to prevent spurious signals from being transmitted over the telephone line 14 when the relay contact K3' switches.

The remote station 10 also includes the flip-flop circuit 47. The flip-flop circuit 47 includes a conventional JK flip-flop 210 having an input terminal T and output terminals Q and $\bar{Q}$ on which are provided complementary output signals. The input terminal T of the flip-flop 210 is connected via a differentiating network 211 to the line 48 which is selectively groundable via relay contact K4'. When the relay contact K4' grounds line 48 in response to energization of the relay K4, a negative voltage spike is input to terminal T of flip-flop 210 switching the flip-flop, which is effective to provide at terminal Q a positive signal level or logical "1," and at terminal $\bar{Q}$ a negative signal level or logical "0." The flip-flop 210 also includes a clear terminal CL, which is effective to reset the flip-flop when a low signal level or logical "0" is input thereto on line 213. A high signal level (logical "1") and a low signal level (logical "0") are output at terminals Q and $\bar{Q}$ of flip-flop 210 during the interrogation and responsive periods of a message bit transmission cycle. These flip-flop output levels at terminals Q and $\bar{Q}$ reverse when flip-flop 210 is reset upon completion of the response period by a low level (logical "0") signal on reset line 213.

The remote station 10 further includes the counter 30 (FIG. 9B). The counter 30 includes four conventional JK flip-flops 214, 215, 216 and 217 which each have a T input terminal and complementary output Q and $\bar{Q}$ terminals. The counter flip-flops 214–216 have their output terminals Q and $\bar{Q}$ connected to the input terminal T of the successive counter stages 215–217 via resistor and capacitor noise suppression circuits 218–220. The T terminal of the first counter flip-flop state 214 is responsive to the output of the flip-flop 210 via a resistor and capacitor noise suppression circuit 209. With the flip-flop stages 214–216 of the counter 30 connected in the manner indicated, and the first stage 214 responsive to the output of the flip-flop 210, the counter 30 functions as a conventional binary counter.

A four-stage binary counter is capable of developing a count of 16. However, in the present system wherein the counter is used to facilitate transmission of a message having only 10 bits, a counter having the capability of developing a count of 10 is sufficient. Accordingly, additional circuitry is used in combination with the four stages 214–217 of the counter 30 to reset the counter after it develops a counter of 10, that is, to reset the counter 30 on a count of 11; thus, the counter has a capacity of 10. The additional circuitry required to limit the counter 30 to a 10-count capacity includes a flip-flop 221, comprising two interconnected NAND Gates 221A and 221B, the inputs of which are responsive to NAND gates 222 and 223. The NAND gate 222 is responsive to various ones of the outputs of the counter flip-flop stages 214–217 and produces on its output line a low level or logical "0" signal on a count of 11 for switching the flip-flop 221 which in turn produces on its output line 224 a low level signal or logical "0" which is input to the clear terminals CL of the counter flip-flop stages for resetting these stages to provide a counter output of 0000. The NAND gate 223 has four inputs which are responsive to various ones of the outputs of the counter flip-flop stages 214–217. The NAND gate 233 functions to produce on its output line a low-level signal or logical "0" when the counter is reset to a count of 0000. This output from NAND gate 223 functions to reset the flip-flop 221 after the counter has been reset to a 0000 count, thereby readying the flip-flop 221 to again reset the counter flip-flop stages 214–217 when the next succeeding count of 11 is reached and a reset output is provided by NAND gate 222.

The remote station 10 further includes the alarm condition code group coder 31. The coder 31 includes two NAND gates 225 and 226 each having three inputs connected to various ones of the counter flip-flop stage outputs 214–217, and a NAND gate 227 connected to the outputs of the NAND gates 225 and 226. The coder 31 functions to provide on its output line 31A a train of six bits which comprise the alarm condition code group of the 10-bit message, the six-bit train output on line 31A constituting the normal alarm condition code group depicted in FIG. 2. The output of the coder 31 on line 31A is at a low level or high level depending on whether a logical "0" or a logical "1" is being generated.

Associated with the coder 31 is a NAND gate 228 having one of its inputs connected to the output line 31A of the coder 31 and the other of its inputs connected to a source of positive potential 229 via a resistor 230 and to ground potential via switches 15S, 16S, and 17S. In the absence of an alarm condition at the remote station, that is, in the absence of activation of one of the alarm condition detectors 15–17, the switches 15S–17S are in the position shown in FIG. 9B. With switches 15S–17S in this position, ground potential is not applied to the NAND gate 228 and the gate is enabled via the positive potential from source 229. With the NAND gate 228 enabled by the positive source 229, the six-bit alarm condition code group output on line 31A from the coder 31 is gated by the NAND gate and output to the pulse-width modulator 22 to be described in detail hereafter. Thus, in the absence of an alarm condition at the remote station, switches 15S–17S are in the position shown in FIG. 9B resulting in NAND gate 228 being enabled such that it gates the six bits of the alarm condition code group to the pulse-width modulator on line 232.

An inverter circuit 41 and a switch circuit 20S function to provide, when one of the switches 15S–17S is switched from the position shown in FIG. 9 in response to activation of its associated alarm condition sensor 15–17, an alternate transmission path to the pulse-width modulator 22 for the normal alarm condition code group bits output from the coder 31 on line 31A. As noted previously, in the presence of an alarm condition at the remote station, switches 15S–17S are in the condition shown in FIG. 9 to enable gate 228 for transmitting the alarm condition code bits output on line 31A from the coder 31 to the pulse-width modulator 22. However, should an alarm condition be detected at the remote station 10 by one of the alarm condition detectors 15–17, the switch 15S–17S associated with the activated alarm condition detector switches from the position shown in FIG. 9, grounding the gating input to NAND gate 228, disabling this gate. With NAND gate 228 disabled, the alarm condition code group output on line 31A from the coder 31 is not gated to the pulse-width modulator on line 232. Instead, the alarm condition code group present on line 31A from the coder 31 in its normal or nonalarm form is transmitted to the pulse-width modulator 22 via an inverter circuit 41 which is rendered effective by the switch 20S. Specifically, when one of the switches 15S–17S switches from the position shown in FIG. 9 in response to the detection of alarm condition at the remote station, a low level or ground potential signal is input to inverter 234 of the switch 20S producing a high level output to NAND gate 235 of the inverter circuit 41, enabling NAND gate 235. With NAND gate 235 enabled, the normal alarm condition code group pulse train output on line 31A of coder 31 is transmitted through the inverter circuit 41 via the inverter 236 and the enabled NAND gate 235 producing on output line 237 an inverted or abnormal alarm condition code group which is input to the pulse-width modulator 22.

Summarizing, in the absence of an alarm condition at the remote station 10, none of the switches 15S–17S are activated by their associated alarm condition sensors 15–17 and, hence, NAND gate 228 is enabled and NAND gate 235 is disabled. With NAND gate 228 enabled and NAND gate 235 disabled, the alarm condition code group output from coder 31 on line 31A is gated to the pulse-width modulator 22 on line 232 via enabled NAND gate 228. Hence, an output is provided on line 232 in the absence of an alarm condition at the remote station. When an alarm condition has been detected at the remote station by one of the alarm condition detectors 15–17 and its associated switch 15S–17S switched, NAND gate 228 is disabled and NAND gate 235 is enabled. With NAND gate 235 enabled, the alarm condition code group is gated to the pulse-width modulator 22 on line 237 via inverter circuit 41 which includes the enabled NAND gate 235. Thus, in the presence of an alarm condition at the remote station, the alarm condition code group output from the coder 31 on line 31A is transmitted to the pulse-width modulator 22 via the inverter circuit 41.

When NAND gate 235 of inverter circuit 41 is enabled and the alarm condition code group output on line 31A from the coder 31 is transmitted to the pulse-width modulator 22 on line 237, the sense or logical level of the signal present on line 237 is identical to that on line 31A. However, since the logical level of the signals actually transmitted on the transmission line 14 to the central station in response to the signals on line 237 is inverted from that output from the coder 31 on line 31A, the circuit 41 is termed herein an "inverter" even though it does not itself produce on line 237 an inversion of the input thereto on line 31A. The logical level of the signals output on line 232 when NAND gate 228 is enabled which occurs in the absence of an alarm condition is inverted relative to the logical level of the signals input thereto from the coder 31 on line 31A. However, since the logical level of the signals output on the transmission line 14 in response to signals input to the pulse width modulator 22 on line 232 is actually the same as that output from the coder 31 on line 31A, the NAND gate 228 is not considered herein to function as an inverter.

The remote station 10 also includes three alarm identity coders and inverters 32, 42; 33, 43; and 34, 44. Alarm identity coder and inverter 32, 42 includes a NAND gate 240. The NAND gate 240 has three of its inputs connected to different ones of the outputs of the counter 30 and one of its inputs connected to the switch 15S associated with the alarm condition detector 15. In the absence of activation of alarm condition detector 15, the switch 15S is in the position shown in FIG. 9B causing a high-level output, or logical "0," to be provided at the output of NAND gate 240 on line 239 to modulator 22 when the counter 30 has accumulated a count of seven. The high-level output from NAND gate 240 in the absence of activation of its associated alarm detector 15 is considered a logical "0" since it causes the transmission of a logical "0" to the central station. Should alarm detector 15 be activated in response to detection of an alarm condition, switch 15S shifts from the position shown in FIG. 9, putting a logical "1" input on its associated input to NAND gate 240, enabling NAND gate 240. With NAND gate 240 enabled, a low-level signal or logical "1" is provided at the output of the gate on line 239 to modulator 22. The logical "0" and "1" designations applied to low-level and high-level signals output from NAND gate 240 is appropriate since low-level and high-level signals result in the transmission of a logical "1" and a logical "0," respectively, on the transmission line 14.

The coder and inverter circuits 33, 43 and 34, 44 operate in combination with their respectively associated switches 16S and 17S and their respectively associated alarm condition detectors 16 and 17 in a manner identical to that of the coder and inverter circuit 32, 42 in combination with its respective switch 15S and alarm condition detector 15. Thus, logical "1" signals (low level) are output from circuits 33, 43 and 34, 44 on line 239 to modulator 22 when switches 16S and 17S, respectively, are transferred from the position shown in FIG. 9 by activation of their associated alarm condition detectors 16 and 17, respectively. Logical "0" signals (high level) are output from circuits 33, 43 and 34, 44 on line 239 to modulator 22 when switches 16S and 17S, respectively, are in the normal nonalarm position (shown in FIG. 9). Of course, it is understood that the output from the circuit 33, 43 is produced when the counter has developed a count of eight following receipt of the eighth interrogation signal, while the output from the circuit 34, 44 is produced on a count of nine.

The remote station 10 further includes a secure/access coder and inversion circuit 35, 45. This circuit 35, 45; like the circuits 32, 42; 33,43; and 34, 44; has three of its inputs connected to different ones of the outputs of the counter 30. The fourth input of the circuit 35, 45 is selectively groundable by a normally closed secure/access switch 241. When the switch 241 in the normally closed position corresponding to the secure mode of operation, the NAND gate 242 of the circuit 35, 45 is disabled, providing a logical "0" (high level) signal on its output line 239 to modulator 22 resulting in the transmission to the central station of a logical "0" reflecting the fact that the system is in the secure mode. When the system is in the access mode, the access/secure switch 241 is in the open condition, enabling NAND gate 242, causing it to provide on its output line 239 to modulator 22 a low level or logical "1" signal which is transmitted to the central station 12 as a logical "1" to reflect operation of the system in the access mode. The output from the circuit 35, 45 is provided after the counter 30 has developed a 10 count following receipt of the 10th interrogation signal.

The remote station 10 includes a delay circuit 50. The delay circuit 50 functions to terminate the interrogation period and start the response period after a delay of approximately 60 msec. from the point in time at which the telephone line 14 is first energized following the rest period of the message bit transmission cycle.

The delay circuit 50 includes a capacitor 244 having its one terminal connected to ground potential. The other terminal of the capacitor 244 is connected to a capacitor-charging circuit which includes a source of positive potential 245, a resistor 246, and a diode 247, and to a discharging circuit which includes a normally nonconducting transistor switch Q4 and a resistor 248. The transistor Q4 has its base resistively coupled to the output terminal Q of the flip-flop 210. Prior to the receipt of the interrogation signal from the central station, the flip-flop 210 is in its reset state providing a low-level output at terminal Q. The low-level output at terminal Q of flip-flop 210 holds the transistor Q4 in a nonconductive state, allowing the capacitor 244 to charge through resistor 246 and diode 247. With the capacitor 244 charged, a relatively high output signal is present on line 51 which constitutes the output of the delay circuit 50.

When the interrogation signal is received at the remote station, which is manifested by energization of the transmission line 14 following a rest period, the relay K4 is energized and its contact K4' transfers to produce an input to flip-flop 210 causing this flip-flop to set. With flip-flop 210 set, a high-level output is provided at its terminal Q which is coupled via flip-flop output line 49A to the base of the normally nonconducting transistor Q4, causing this transistor to switch to its conductive state. Conduction of transistor Q4 completes the discharge path for the capacitor 244 through the resistor 248 causing the capacitor to begin discharging. When the capacitor 244 has discharged, a low-level signal is provided on the output line 51 of delay circuit 50. Thus, upon receipt of the interrogation signal from the central station, the flip-flop circuit 47 provides an output on line 49A to the delay circuit 50, causing a low-level output to be provided on delay circuit output line 51. This output is provided only after a lapse of a predetermined delay established by the resistor 248 in the discharged path of capacitor 244, which delay is approximately 60 msec. corresponding to the length of the interrogation period. Thus, the delay circuit 50 establishes the length of the interrogation period of a bit transmission cycle.

The remote station 10 further includes a pulse generator 52. The pulse generator 52 has a first transistor Q5 and a second transistor Q3 both of which are normally nonconducting. The transistor Q5 has its emitter connected to a regulated power supply 250 and its collector connected to ground potential via a resistor 251. Transistor Q4 has its emitter collector path connected in series with the relay K3 and functions as a switch in the energization circuit of the relay K3. The base of the transistor Q3 is connected via a diode 253 and a resistor 254 to the collector of transistor Q5. When the capacitor 244 of the delay circuit 50 has discharged coincident with the end of the interrogation period of the bit transmission cycle and produced a low-level output on its output line 51, the transistor Q5 is switched to a conductive state, raising its collector potential. This is effective to switch transistor Q3 to a conductive state and complete the energization circuit for the relay K3, causing relay K3 to energize. Energization of relay K3 opens its normally closed contact K3' connected in the transmission line, thereby effectively starting the response period of the message bit transmission cycle.

The remote station further includes a pulse-width modulator 22. The modulator 22 includes a capacitor 252, one terminal of which is connected to ground potential. The other terminal of capacitor 252 is connected alternatively to a charging circuit which includes a source of positive potential 257, a resistor 256, and a diode 255, and to a selectively variable impedance discharging path. The discharging path includes, depending upon whether a logical "1" or a logical "0" is to be transmitted, either the resistor 258 and the emitter-collector path of the normally nonconducting transistor switch Q7, or both the resistor 258 and the emitter-collector path of a transistor Q7 and a resistor 260 and the emitter-collector path of a normally nonconducting transistor switch Q10. Thus, if a logical "1" is to be transmitted, the discharge path of the capacitor 252 includes only the resistor 258 and the associated transistor switch Q7. If a logical "0" is to be transmitted, the discharge path of the capacitor 252 includes both the resistor 258 and its associated transistor switch Q7 and the resistor 260 and its associated transistor switch Q10. The values of resistors 258 and 260 are selected such that, when a logical "1" is to be transmitted and resistor 258 is the only resistor in the capacitor discharge circuit, the capacitor discharges in approximately 140 msec. and when a logical "0" is to be transmitted wherein both resistors 258 and 260 are in parallel in the capacitor discharge path, the capacitor discharges in approximately 60 msec.

The pulse-width modulator 22 also includes a transistor Q13, the emitter of which is connected to both line 237 and line 232 on which the abnormal or inverted alarm condition code group and the normal or noninverted alarm condition code group, respectively, are present. The base of transistor Q13 is responsive to the common output line 239 of the coder and inverted circuits 32, 42; 33, 43; 34, 44; and 35, 45.

In the absence of an alarm condition at the remote station 10, when an alarm condition code group bit having a logical "0" is to be transmitted, a low-level or logical "0" signal is output from the coder 31 on line 31A and is gated by enabled NAND gate 228 on line 232 to the pulse-width modulator 22, causing transistor Q13 to switch to its nonconducting state. Switching of transistor Q13 to a nonconductive state raises the potential of the emitter thereof switching transistor Q10 to its conductive state. With Q10 rendered conductive, resistor 260 is in parallel with resistor 258 in the discharge path of capacitor 252, causing the discharge time of the capacitor 262 to be approximately 60 msec. Under such circumstances, a voltage output is provided on line 54, constituting the output of the pulse-width modulator 22 after a lapse of approximately 60 msec. from the initiation of the response period. The low-level output on line 57 coincides and is effective to terminate the response interval.

If, in the absence of an alarm at the remote station, a logical "1" alarm code group bit is to be transmitted, a high-level output is present on line 31A producing a low-level output on line 232 which switches on transistor Q13. Conduction of transistor Q13 lowers its collector potential, switching off transistor Q10. With transistor Q10 in a nonconducting condition, only resistor 258 is in the discharge path of capacitor 252, causing the capacitor 252 to take approximately 140 msec. to discharge, whereupon a low-level signal is output on line 54 of the pulse-width modulator 22.

If an alarm condition is present at the remote station, the alarm condition code group bit on line 31A is gated via the inverter circuit 41, producing an output on line 237 which controls the state of transistor Q13 and, hence, the state of transistor Q10, producing either a 60 msec. or 140 msec. discharge time for capacitor 252. Specifically, if a logical "0" is present on line 31A, a logical "0" is present on line 237, causing transistor Q13 to be rendered conductive, in turn causing transistor Q10 to be rendered nonconductive, producing a low-level output on line 54 approximately 140 msec. after initiation of the response. If a logical "1" is present on line 31A, a logical "1" is present on line 237 causing transistor Q13 to be rendered nonconductive and in turn transistor Q10 to be rendered conductive. With transistor Q10 conductive, a low-level output is produced on line 54 approximately 60 msec. after initiation of the response.

The remote station 10 further includes an end-of-pulse detector 56 having a normally nonconductive transistor Q11, the base of which is responsive to the output of the pulse-width modulator on line 54, and a second normally nonconductive transistor Q12, the base of which is resistively coupled to the collector of transistor Q11. The collector of transistor Q12 constitutes the output of the end-of-pulse detector 56 and is designated line 57. When a low-level output is produced by the pulse-width modulator 22 and is output on line 54, which occurs either 60 msec. or 140 msec. after initiation of the response period corresponding to transmission of a logical "0" and a logical "1," respectively, a normally nonconductive transistor Q11 is switched on, in turn switching on normally nonconducting transistor Q12. Conduction of transistor Q12 lowers its collector potential, producing a low-level signal on line 57. The low-level signal on line 57 which is substantially coincident with the low-level output on line 54A from the pulse-width modulator 22, functions to reset the flip-flop 210 via reset line 213. Resetting of the flip-flop 210 switches off transistor Q4 of the delay circuit 50, which in turn switches off transistor Q5 and transistor Q3 of the pulse generator 52, causing the relay K3 to be deenergized, which in turn closes the transmission line via transferred switch K3' to terminate the response period. A capacitor 259 connected in the base circuit of transistor Q12 is provided to maintain transistor Q12 conductive for a predetermined interval upon switching at the end of the response period. Maintenance of conduction of transistor Q12 maintains the reset signal input on line 57 to the clear terminal of flip-flop 210 for a period sufficient to prevent this flip-flop from setting when the relay K4 subsequently energizes upon completion of the transmission line at the end of the response period.

The operation of the remote station during a message-bit-transmitting cycle is now described. Assuming the system is in the rest period subsequent to transmission of the 10th message bit, the telephone transmission lines 14 are in the open circuit condition by virtue of energization of relay K2 at the central station which places its contact K2' in the open condition, interrupting the electrical continuity of the transmission line. With the telephone lines in the open circuit condition, remote station relay K4 is deenergized placing its contact K4' in the solid-line position shown in FIG. 9. Remote station relay K3 is deenergized, placing its contact K3' in the solid-line position shown in FIG. 9, closing its associated section of the transmission line.

Figure 10B:
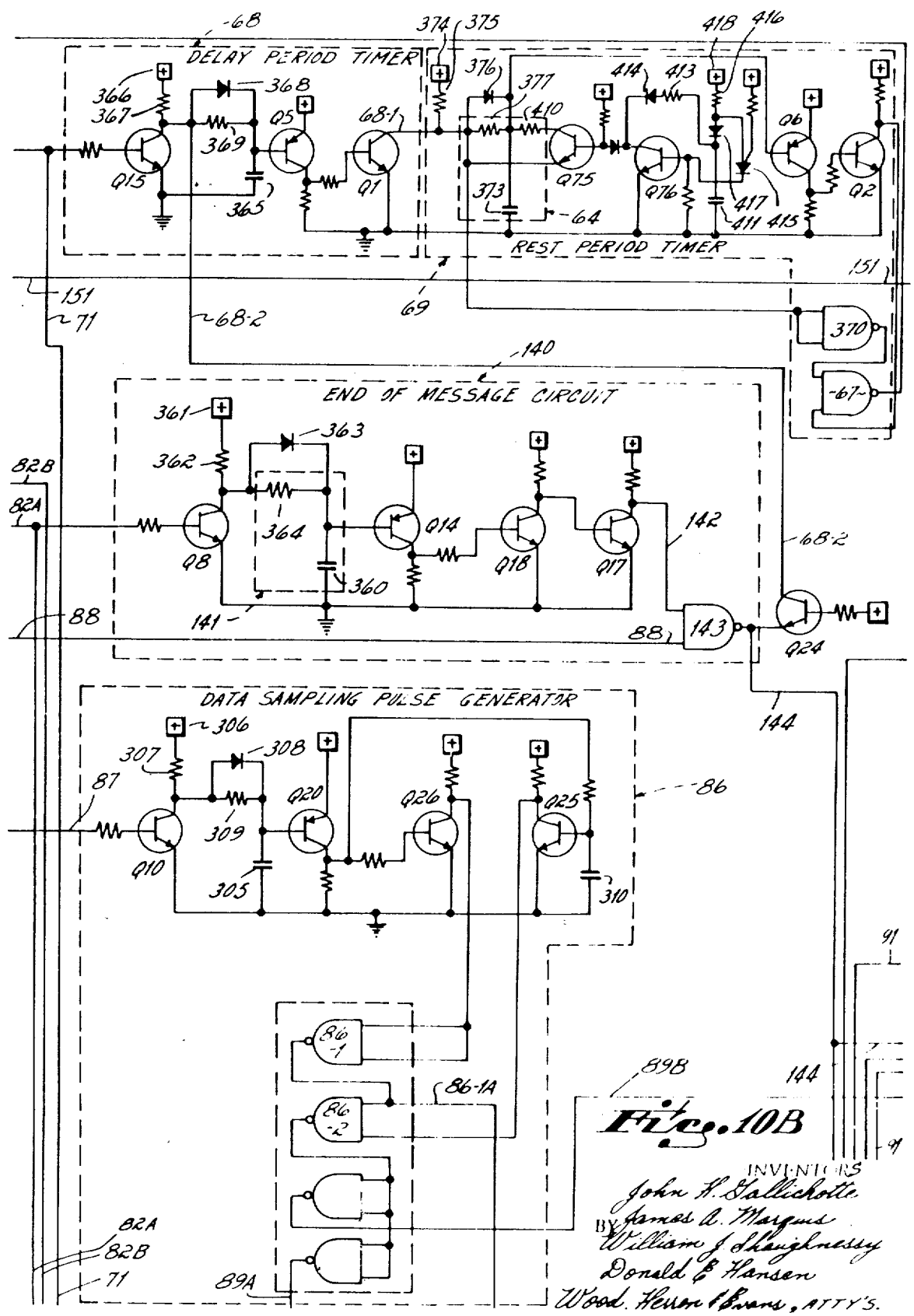
Figure 10G:
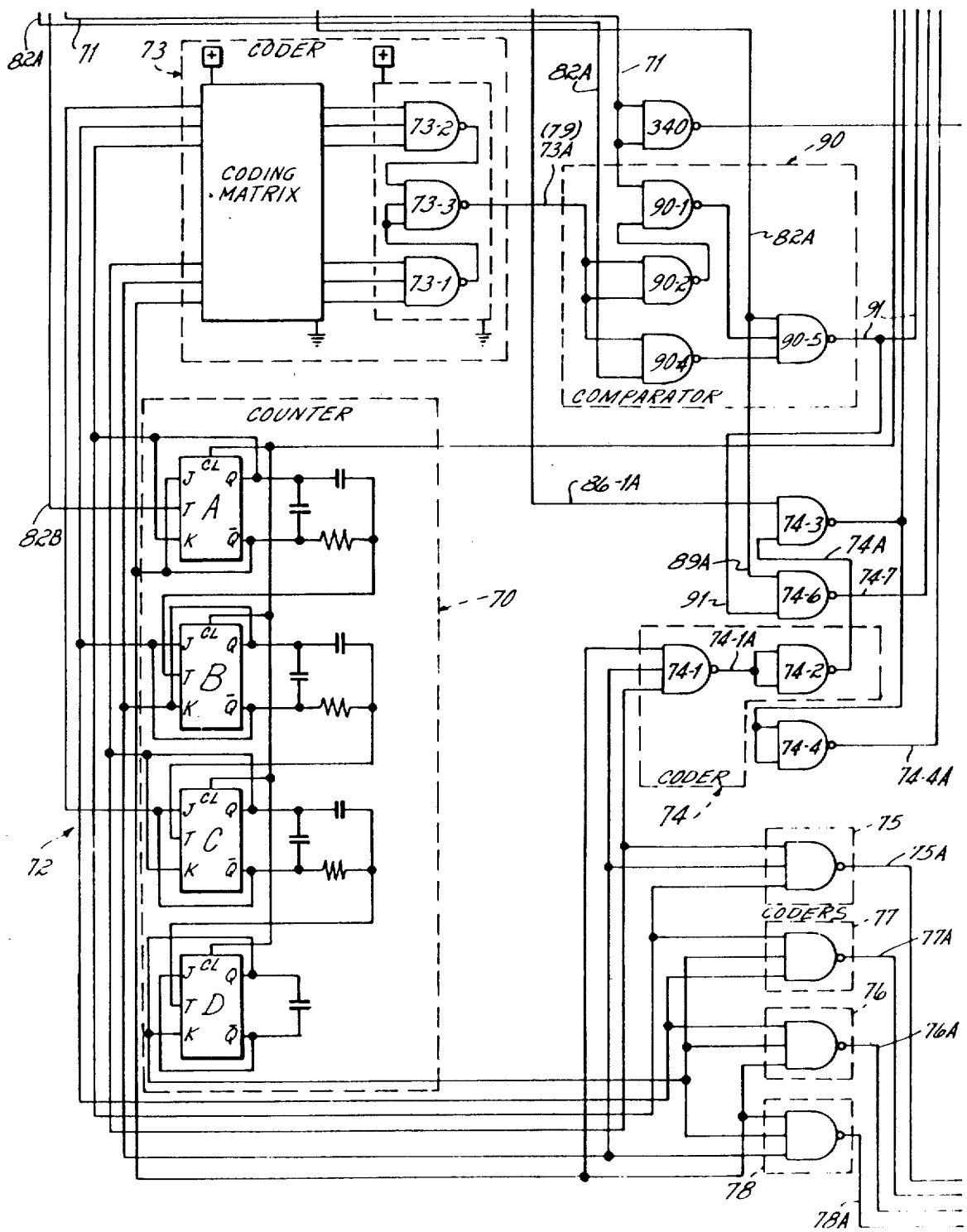
FIG. 10G is a layout depicting the relationship of FIGS. 10A-10F.
Figure 10D:
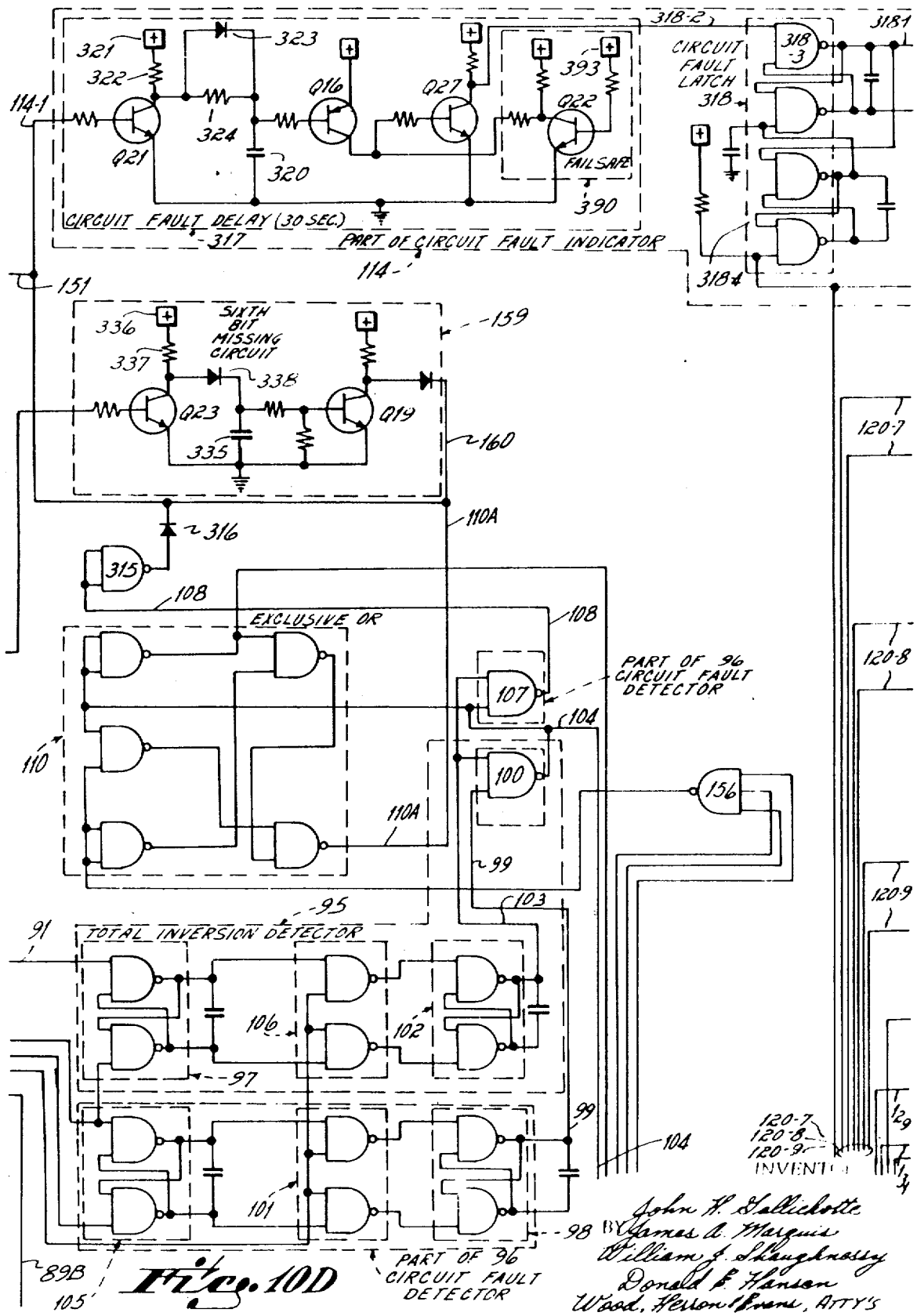
Figure 10F:
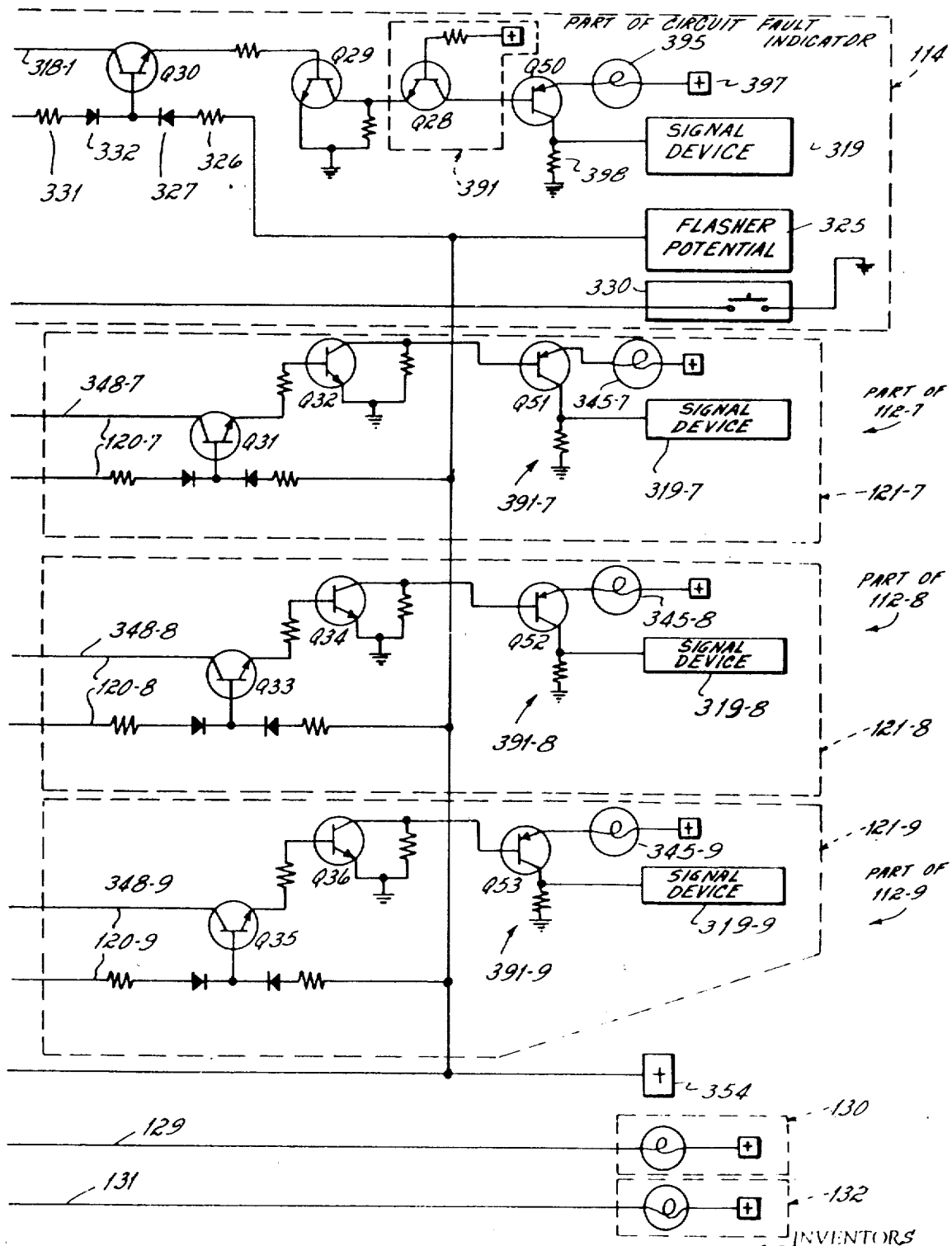

Upon completion of the rest period, the central station relay K2 is deenergized, transferring its contact K2' to the solid-line position of FIG. 10, energizing the transmission line 14. With the transmission line 14 energized, the remote station relay K4 is energized transferring its contact K4' from the position shown in FIG. 9. This grounds line 48 constituting the input of the flip-flop circuit 47. The flip-flop 210 is set, providing a signal on line 49B to the counter 30 to advance the counter one count. With the counter so advanced, the first bit of the alarm condition code group is output from the coder 31 on line 31A. Depending upon whether or not an alarm condition exists at the remote station, the bit signal present on line 31A is input to the pulse-width modulator 22 in either its normal or inverted form readying the pulse-width modulator for transmitting the bit during the response period.

Setting of the flip-flop 210 in response to closure of relay contact K4' also provides an output on line 49A to the delay circuit 50. The delay circuit 50 in turn provides an output on line 51 at the termination of the interrogation period which is approximately 60 msec. after energization of relay K4. The output from the delay circuit 50 coincident with termination of the interrogation period causes the pulse generator 52 to initiate transmission of the first message bit by energizing relay K3 which transfers relay contact K3' to interrupt the transmission line. Depending upon the logical level of the signal input to the pulse-width modulator 22 from the zone coder 31, a signal is output from the pulse-width modulator 22 on line 54 either 60 or 140 msec. after relay K3 is energized coincident with the start of the response period by the output from the delay circuit 50 on line 51.

The output from the pulse-width generator 22 on line 54 is input to an end-of-pulse circuit 56. The end-of-pulse circuit 56 generates a reset signal on line 213 which resets the flip-flop 210. Resetting of flip-flop 210 in turn switches off transistors Q4, Q5, and Q3 of the delay circuit 50 and the pulse generator 52, terminating energization of relay K3 which returns contact K3' to its normal position, completing the transmission line circuit and terminating the response period. The resetting of the flip-flop 210 is also effective to switch off transistors Q7, Q11, and Q12 of the pulse-width modulator circuit 22 and the end-of-pulse detector circuit 56.

Following completion of the response period, the transmission line is energized for a period of 60 msec. corresponding to the delay period. Energization of the line during the delay period is effected by relay K2 at the central station which is now deenergized. At the end of the delay period, the duration of which is determined by the central station 12, the transmission line 14 is open circuited by the energization of central station relay K2. Open circuiting of the transmission line 14 continues for a random length period of between approximately 60 msec. and 120 msec. whereupon the transmission line is again energized by the deenergization of relay K2 at the central station, beginning the next interrogation period. The energization of the telephone line 14 at the start of the second interrogation period is effective to again energize remote station relay K4 which sets flip-flop 210. The setting of flip-flop 210, in the manner described, advances the counter 30 via a signal input thereto on line 49B, and initiates a response period, during which transmission of the second message bit occurs, via the output on line 49A after a suitable delay period established by the circuit 50 corresponding to the duration of the interrogation period. The sequence of interrogation period, response period, delay period, and rest period continues until all 10 bits of the message have been transmitted. When the entire message has been transmitted, the counter is reset and the message transmission sequence is repeated.

DETAILED DESCRIPTION OF CENTRAL STATION CIRCUIT

The remote station 12 includes the relays K1 and K2, and their associated contacts K2' and K3'. The relay K2 has its normally closed contact K2' in series with a source of potential 300 which supplies potential to the telephone line 14. The relay K2 is connected between the source of positive potential 65 and the line 66. The relay K1 is connected to the transmission line 14 via a phase inversion circuit 60. The phase inversion circuit 60 functions to energize the relay K1 when the telephone line is deenergized and deenergize the relay K1 when the telephone line is energized. The phase inverter 60 may include a source of potential and a transistor switch connected in series with the relay K1, the transistor switch having its base circuit responsive to the energization condition of the telephone line for switching to a conductive state for energizing the relay when the telephone line is deenergized and for switching to a nonconductive state to deenergize the relay when the telephone line is energized. The relay K1 has its contact K1' connected between ground potential and alternatively between the terminals 62 and 63.

As shown in FIG. 8, the relay K1 is energized during the response period and during the rest period. The relay K2 is energized only during the rest period as shown in FIG. 5.

The remote station 12 includes the flip-flop 80 having an input terminal T which is connected via a differentiating network 299 to terminal 63. The flip-flop 80 also has output terminals Q and $\overline{Q}$. The terminals $\overline{Q}$ and Q of flip-flop 80 are connected via a noise suppression circuit 301 to the flip-flop output lines 71 and 82A and 82B. The flip-flop 80 is set at the beginning of the interrogation period when the transmission line is energized and relay K1 is deenergized transferring its contact K1' to the position shown in FIG. 10A. With the flip-flop 80 in the set condition, a low-level or logical "0" output is provided at terminal $\overline{Q}$, and its complement, a high-level or logical "1" output, is provided at terminal Q. The outputs at terminals $\overline{Q}$ and Q are input to the comparator 90 via line 82A and the detector circuits 113–7, 113–8, 113–9 and 126 via line 71 and inverter 340 to facilitate data bit sampling. The flip-flop 80 remains in the set condition until terminal 63 is again grounded when (a) the relay K1 is again deenergized which occurs at the end of a response when the transmission line is closed via contact K3' of relay K3 at the remote station, or (b) a clear signal is input to its clear terminal CL during the rest period should message transmission be complete and no response forthcoming. At this time, that is, at the end of the response period, an input is provided to terminal T of the flip-flop 80 as contact K1' transfers to the position shown in FIG. 10 whereupon the output at terminals $\overline{Q}$ and Q is high, and low, respectively.

The low-level signal output at terminal $\overline{Q}$ at the start of the interrogation period when the flip-flop 80 is set functions via line 71 to reset the delay period timer circuit 68 and the rest period timer circuit 69 in a manner to be described. The output from the flip-flop 80 at terminal Q when the flip-flop is set is also input to the counter 70 via line 82B, advancing the counter one count, and is input to the end-of-message circuit 140 via line 82A to develop an end-of-message signal should an interrogation signal fail to produce a response.

The central station 12 also includes the flip-flop 85 which has an input terminal T and output terminals Q and $\overline{Q}$ at which complementary output signals are provided. The input terminal T of flip-flop 85 is connected via a differentiating network 303 to the terminal 62. The output terminals Q and $\overline{Q}$ are connected to flip-flop output lines 87 and 88, respectively. The flip-flop 85 is placed in the set condition providing high and low signal level outputs on lines 87 and 88, respectively, at the start of the response period and remains set until the beginning of the rest period when a reset signal is input thereto at its clear terminal CL. The output line 88 connected to terminal $\overline{Q}$ of flip-flop 85 is input to a NAND gate 143 of the end-of-message circuit 140 to disable the end-of-message circuit should a response be forthcoming following an interrogation signal. The output line 88 is also input to a telephone line short-circuit detector 153, to be described, to enable this circuit to monitor the condition of the telephone line and generate an output on line 154 if the telephone line is energized excessively long. Output line 87 is connected to terminal Q of flip-flop 85 and is input to the data-sampling pulse generator circuit 86 to initiate the generation of a 1-msec. sampling pulse which is used to determine whether the response is a logical "0" or a logical "1," in a manner to be described.

The central station 12 includes the counter 70 which is responsive to the output from the flip-flop 80 on line 82B. The counter 70 is a four-stage counter, each stage comprising a conventional JK flip-flop. The counter flip-flops are interconnected in conventional binary counter configuration and are capable of accumulating a count of 16. However, in normal usage, since only 10 message bits are transmitted, the counter 70 is reset by an input to the clear terminals of the counter flip-flop stages on line 144 subsequent to receipt of the 10th and last message bit.

Associated with the counter 70 are the coders 73–78. The coder 73 includes a pair of NAND gates 73–1 and 73–2 which have their inputs connected to different ones of the counter outputs and their outputs connected to the input of a NAND gate 73–3. The output of the NAND gate 73–3 constitutes the output of the coder 73. In operation, as the counter 70 proceeds through a count of one to six in response to six inputs thereto on line 82B, indicating the receipt of the first six message bits which comprise the alarm condition code group, the coder 73 provides on its output line 73A the six-bit train 101101 corresponding to the normal bits of the alarm condition code group depicted in FIG. 3. The six bits of the pulse train output on line 73A from the coder 73 are produced in synchronism with the receipt of the first six bits of the message corresponding to the alarm condition code group, and are input to a comparator circuit 90 which in a manner to be described determines whether the received message bit is the same as that generated internally at the central station by the combination of the counter 70 and the coder 73, or is an inversion thereof.

The coder 73 includes a NAND gate 74–1 having its input connected to different ones of the outputs of the counter 70 for providing on its output line 74–1A a signal when the counter has developed a count of six. The coder 74 also includes an inverter 74–2 connected to the output of the NAND gate 74–1. The inverter 74–2 has an output 74A connected to the NAND gate 74–3 which is also responsive to a signal output from the data-sampling pulse generator 86 which is present on line 86–1A during a portion of the response period. The output of NAND gate 74–3 is input via an inverter 74–4 and line 74–4A to the NAND gates 101 and 106, to be described, for enabling these latter NAND gates during the sampling interval of the sixth message bit received. The output of NAND gate 74–3 is also input to the six-bit missing circuit 159 for disabling this circuit if the sixth bit is in fact received from the remote station 10.

The coders 75, 76 and 77 each comprise NAND gates having their respective inputs connected to different ones of the outputs of the counter 70 for providing on their respective output lines 75A, 76A and 77A the normal seventh, eighth and ninth bits of the message corresponding to the first, second and third bits of the normal alarm identity code group. The bits output on lines 75A, 76A and 77A are generated in synchronism with the receipt at the central station of the seventh, eighth, and ninth message bits, and are the normal alarm identity code group bits depicted in FIG. 2, namely, 0, 0, 0.

The coder 78 comprises a NAND gate having its inputs connected to different ones of the counter outputs. The coder 78 provides on its output line 78A the normal secure/access code group bit which is a "0" corresponding to the secure condition, as shown in FIG. 2. The output on coder line 78A is generated in synchronism with the receipt of the 10th and last message bit from the remote station.

The central station also includes the data-sampling pulse generator 86 which provides on its output lines 89A and 89B 1-msec. data-sampling pulses at a point in time 103 msec. after the start of each response period. The data-sampling pulse generator 86 includes a capacitor 305 which normally charges from a source of positive potential 306 through a resistor 307 and a diode 308. The capacitor 205 has a discharge path including a resistor 309 and the emitter-collector path of a transistor Q10 which is normally nonconductive. When a high-level output is provided on line 87 from the flip-flop 85 in response to energization of relay K1 which grounds flip-flop input terminal 62, the transistor Q10 is rendered conductive, permitting the capacitor 305 to discharge. When the capacitor 305 discharges, which takes approximately 103 msec., a low-level output is provided to the base circuit of a transistor Q20 which is normally nonconductive. The low-level signal input to transistor Q20 approximately 103 msec. after the start of the response period, switches transistor Q20 on, providing a high-level signal at its collector.

The high-level signal at the collector of transistor Q20 is input to the base circuit of a normally nonconducting transistor Q26 rendering this transistor conductive, which in turn provides a high-level input via an inverter 86–1 to one input of a NAND gate 86–2. The high-level signal at the collector of transistor Q20 which appears approximately 103 msec. after the start of the response period is also input to a normally nonconducting transistor Q25 having a capacitor 310 connected in its base circuit. By virtue of the capacitor 310, the transistor Q25 is not rendered conductive, providing a second input to the NAND gate 86–2, until after a delay of approximately 1 msec. following the switching into a conductive state of transistor Q26. The combination of inputs to NAND gate 86–2 from the collectors of transistors Q25 and Q26 is effective to provide at the output of NAND gate 86–2 a 1-msec. low-level pulse at a point in time approximately 103 msec. after the start of the response period. This output from the NAND gate 86–2 which occurs once per bit transmission cycle, functions as a data-sampling pulse and is output in inverted form on both lines 89A and 89B as a logical "1" or high-level signal. It is to be pointed out that the data-sampling pulse terminates when the capacitor Q25 switches on, which occurs approximately 1 msec. after transistor Q26 switches on. Thus, the data-sampling pulse only exists during the interval of time between the turning on of transistor Q26 and the turning off of transistor Q25.

The comparator circuit 90 is provided to compare, on a sequential basis, the first six message bits received from the central station with the first six bits internally generated by the combination of the counter 70 and the coder 73 for the purpose of determining whether one or more of the received alarm condition code group bits has been inverted as a consequence of an alarm condition at the remote station or a circuit fault. The comparator 90 includes a NAND gate 90–1 which is responsive to the output line 71 of the flip-flop 80. Flip-flop 80, it will be recalled, is returned from the set state to the reset state at the termination of the response period which is either 60 msec. or 140 msec. after the beginning of the response period depending on whether a logical "0" or a logical "1" is transmitted. Thus, the state of flip-flop 80, when properly sampled, indicates whether a logical "0" or a logical "1" signal was transmitted. The NAND gate 90–1 is also in response to the output of the coder 73 on line 73A via an inverter 90–2. The comparator further includes a second NAND gate 90–4 responsive to the output of coder 73 on line 73A and the output line 82 of the flip-flop 80. A third NAND gate 90–5 is provided which is responsive to both the output of gate 90–1 and the output of gate 90–4, as well as the data-sampling pulse output on line 89A from the sampling pulse generator 89 which is present 103 msec. after the start of the response period. The NAND gate 90–5 provides, at its output, a low-level signal or logical "0" when the received alarm condition code group bit is the inverse of the counterpart alarm condition code group bit generated by the central station counter 70 and coder 73, and a high-level or logical "1" signal when the received and internally generated alarm condition code group bits are the same.

The comparator circuit 90 in effect samples the circuit of the flip-flop 80 to ascertain whether the received bit is a logical "0" or a logical "1" and then compares this information with the bit internally generated at the central station by the combination of the counter 70 and the coder 73. The flip-flop 80 is set, placing a high-level output on line 82 at the start of the interrogation period and remains set providing the high-level output on line 82 until the response period has ended. The end of the response period is either 60 msec. or 140 msec. after the start of the response period depending upon whether a logical "0" or a logical "1" is received. Thus, by sampling the output on line 82 of the flip-flop 80 approximately 103 msec. after the response period has started it is possible to ascertain whether a logical "0" or a logical "1" was received. If a logical "0" was received, the output on line 82, when sampled, will be at a low level, whereas if a logical "1" was received, the output on line 82 will be a high-level signal.

The central station also includes the alarm condition code group inversion detector circuit 95. The inversion detector circuit 95 includes a flip-flop 97 having an input responsive to the output of the comparator circuit 90 on line 91. The flip-flop 97 is set by a logical "0" or a low-level input on line 91 which, as indicated previously, occurs if the internally generated alarm condition code group bit and the received alarm condition code group bit do not match. Thus, the flip-flop 97 is set if one or more of the six alarm condition code group bits received from the remote station are inversions of the internally generated alarm condition code group bits produced at the central station by the combination of the counter 70 and the coder 73. The flip-flop 97 remains unset if none of the received alarm condition code group bits are inverted relative to the internally generated alarm condition code group bits. This condition of the flip-flop 97 is sampled, after receipt by the central station of the sixth and last of the alarm condition code group bits, and upon generation of the data-sampling output pulse from the data-sampling pulse generator, by a pair of NAND gates 106. The sampled information is then stored in a second flip-flop 102 having an output line 103. Specifically, following receipt of the sixth and last alarm code group bit from the remote station the coder 74 produces on its output line 74A an enabling pulse which is input to NAND gate 74–3 whose other input is responsive to the output of the data-sampling pulse generator 89 on line 86–1A. When both inputs to NAND gate 74–3 are present, a gating signal is output on line 74–4A via inverter 74–4 to the NAND gates 106, the other inputs of which are responsive to the outputs of flip-flop 97. The gating signals produced on line 74–4A gate the information present in the flip-flop 97 to the flip-flop 102 wherein it is stored until the sixth bit of the next message is received. If one or more of the six alarm condition code group bits received from the remote station is inverted with respect to the alarm condition code group bits internally generated at the central station by the counter 70 and the coder 73, the flip-flop 97 will have been set producing a high-level or logical "1" signal on line 103 constituting the output of storage flip-flop 102. If none of the received alarm condition code group bits are inverted relative to their counterparts generated internally at the central station, a low-level or logical "0" is provided on line 103 from the flip-flop 102. The alarm condition code group inversion detector circuit 95 also includes the NAND gate 100 which has one of its inputs connected to line 103 and the other of its inputs connected to line 99 of the flip-flop 98. A low-level signal or logical "0" is present on line 99 if one or more of the received alarm condition code group bits compares favorably with the internally generated alarm condition code group bits produced at the central station by the counter 70 and coder 73.

Assuming a logical "1" is input to NAND gate 100 on line 103 indicating that at least one of the alarm condition code group bits received is inverted relative to its counterpart internally generated at the central station, and line 99 contains a logical "1" indicating that no one or more of the received bits matches the internally generated alarm condition code group bits, the NAND gate 100 produces on its output line 104 a low-level or logical "0" signal indicating that a total inversion of the alarm condition code group bits has occurred. Specifically, a low-level signal is provided on line 104 of NAND gate 100 when each and every one of the six alarm condition code group bits received at the central station is inverted relative to their respective counterpart bits generated at the central station by the counter 70 and coder 73.

The circuit fault detector circuit 96 includes a flip-flop 105 which is set if one or more of the alarm condition code group bits received by the central station matches their respective counterpart alarm condition code group bit generated at the central station. If none of the received alarm condition code group bits match the alarm condition code group bits internally generated at the central station, the flip-flop 105 remains unset. The condition of the flip-flop 105 following receipt of the sixth and last alarm condition code group bit is sampled by the NAND gates 101 and the sampled information stored in the flip-flop 98 until the sixth bit is received during the next message transmission operation. The NAND gates 101 are enabled by a signal on line 74–4A following receipt of the sixth bit and the occurrence of a sampling signal on line 86–1 from sampling signal generator 89, and when enabled gate the output of the flip-flop 97 to the storage flip-flop 98. The output of the flip-flop 98 is taken at line 99 and is at a high-level or logical "1" when no one or more of the received alarm condition code group bits matches its counterpart internally generated at the central station, and is at a low-level or logical "0" if one or more of the received bits matches its internally generated counterpart. The circuit fault detector 96 also includes the NAND gate 107. NAND gate 107 is responsive on one of its input's lines to the output of flip-flop 102 on line 103, and on its other input line to the output of the NAND gate 100. If not all of the received alarm condition code group bits have been inverted relative to their counterparts internally generated at the central station a logical "1" is input to NAND gate 107 on line 104. If one or more of the received bits is inverted relative to its counterpart internally generated at the central station a logical "1" is input to NAND gate 107 on line 103. With a logical "1" on both input lines to NAND gate 107, indicating that at least one but not all of the received bits were inverted relative to their counterparts generated at the central station a logical "0" is output on line 108, indicating that a circuit fault exists. It will be recalled that if an alarm condition has been detected at the remote station all of the alarm condition code group bits are inverted and transmitted on the telephone lines in their inverted form. However, if the central station detects an inversion of at least one of the received alarm condition code group bits but not an inversion of all of the alarm condition code group bits, a circuit fault is deemed to have occurred and as such is indicated by a logical "0" signal on line 108 output from NAND gate 107.

The central station 12 also includes a circuit fault indicator circuit 114. The circuit fault indicator circuit 114 is responsive to the output of the circuit fault detector on line 108 via an inverter 315 and a diode 316, as well as certain other inputs to be described later. The circuit fault indicator 114 includes a delay circuit 317, a circuit fault latch 318, and a circuit fault signal device 395. The circuit alarm delay 317 in effect requires, before activating the latch circuit 318 to provide a signal from the indicating device 395, that the circuit fault condition exist for approximately 30 seconds. This prevents the latching of the latch circuit 318 and the generation of a continuing signal from signal device 395 in response to an input to the circuit fault detector 114 caused by a temporary or spurious fault condition.

The circuit fault delay circuit 317 includes a capacitor 320 which is normally charged via a charge circuit including a source of positive potential 321, a resistor 322, and a diode 323. With the capacitor 320 normally charged, a high-level signal is input to the base of a normally nonconducting transistor Q16 holding this transistor nonconductive. With transistor Q16 nonconductive, a transistor Q27 is also rendered nonconductive maintaining the collector of transistor Q27, which constitutes the output of the delay circuit and the input of the circuit fault latch 318, at a normally high signal level. With the input to the circuit fault latch 318 at a high signal level, the latch remains in its noncircuit fault for normal condition providing a low-level signal on the latch output line 318–1. With a low-level signal provided on the circuit fault latch output line 318–1, a transistor Q30 is rendered nonconductive maintaining transistor Q29 nonconductive. With transistor Q29 nonconductive, a very small or trickle current flows through the emitter-collector path of a transistor Q28. With a trickle current flowing through the emitter-collector path of transistor Q28, a transistor Q50 is rendered only very slightly conductive providing a relatively low current through the circuit fault signal device 395. Such a low-level current is insufficient to activate the circuit fault signal device 319 which may, for example, be a lamp.

Should an input be provided on line 114–1 to the circuit fault delay circuit 317 from the circuit fault detector 96 on line 108 (via inverter 315 and diode 316), indicating the existence of a circuit fault, a transistor Q21 will be rendered conductive. The emitter-collector path of transistor Q21 and resistor 324 constitute a discharge path for the normally charged capacitor 320. If the input to the circuit fault delay circuit 317 on line 114–1 exists for a period of approximately 30 seconds, the capacitor 320 discharges to a level sufficient to switch on normally nonconducting transistor Q16 which in turn switches on normally nonconducting transistor Q27. The switching on of transistor Q27 provides a low-level input to the latch circuit 318 on line 318–2, causing a flip-flop 318–3 of the circuit latch 318 to set producing a high-level signal on output line 318–1. The high-level signal on line 318–1 enables the transistor Q30 to conduct should an appropriate input signal be provided thereto at its base.

A pulsating unidirectional potential provided by a flasher potential source 325 is continuously applied to the base of transistor Q30 in combination with the high-level signal applied to the collector transistor Q30 by the output line 318–1 of the circuit fault latch 318 causes the transistor Q30 to operate as an amplifier alternatively being driven in and out of saturation in synchronism with the pulses of potential from the flasher source 325. The alternate conduction and nonconduction of transistor Q30 switches transistor Q29 on and off which in turn causes transistor Q28 to alternately conduct heavily and lightly in turn causing transistor Q50 to alternately conduct heavily and lightly. Such conduction of transistor Q50 at alternating high and low levels causes the circuit fault signal device 395 to be operated on an intermittent basis. If the circuit fault signal device 395 is a buzzer, the buzzing would be intermittent in nature. Similarly, if the signal device 395 is an incandescent lamp, the lamp, would alternately flash on and off.

In order for the circuit fault signal device 395 to be activated, the input to the circuit fault indicator 114 on line 114–1 which indicates that a circuit fault has occurred must exist for a period of at least 30 seconds. In this way spurious or temporary conditions of short duration which generate circuit fault inputs on line 114–1 are not effective to activate the circuit fault signal device 395.

To enable the central station personnel to convert the flashing or intermittent signal provided by the signal device 395 to a continuous signal after they have taken appropriate note of the existence of the circuit fault condition, a silence switch 330 is provided. The silence switch 330, when momentarily actuated, functions to momentarily ground the input to a second flip-flop 318–4 of the circuit fault latch 318, causing this flip-flop to be set. With flip-flop 318–4 set, a continuous positive signal is applied via resistor 331 and diode 332 to the base of transistor Q30. With a continuous positive signal applied to the base of transistor Q30, via resistor 331 and diode 332, the transistor Q30 is driven into saturation. With transistor Q30 continuously saturated, transistors Q28, Q29 and Q50 continuously conduct at a high level, causing the circuit fault signal device 395 to produce a continuous signal. Prior to activation of the silence switch 330, the input to the base of transistor Q30 via resistor 331 and diode 332 was a low-level signal due to the fact that flip-flop 318–3 had been set by the signal on line 318–2 indicating the existence of a circuit fault condition for approximately 30 seconds. Transistor Q30 could nevertheless intermittently conduct by virtue of the flasher potential applied to its base circuit from source 325 via diode 327 and resistor 326 in combination with the positive potential applied to the collector by the set flip-flop 318–3.

As indicated, activation of the silence switch 330 after setting of the flip-flop 318–3 in response to an extended circuit fault condition, causes the transistor Q30 to conduct continuously providing a continuous signal output from the device 395. However, when the circuit fault condition terminates and capacitor 320 charges to render nonconductive transistors Q16, Q27 and in turn reset flip-flop 318–3, the transistor Q30 will be rendered nonconductive, terminating the input to the circuit fault signal device 395. This occurs because the output from the flip-flop 318–3 on line 318–1 goes to a low level removing the bias from the transistor Q30.

A sixth bit missing circuit 159 is also included in the central station 12 and functions to provide an input to the circuit fault indicator 114 on line 114–1 if the sixth bit of a message is repeatedly missing for a specified period of time. The sixth bit missing circuit includes a normally conducting transistor Q23, a capacitor 335, and a normally conducting transistor Q19 whose collector constitutes the output of the sixth bit missing circuit 159. Transistor Q23 is rendered nonconductive once per message bit when the sixth bit is present as established by an output from NAND gate 74–3. With transistor Q23 rendered conductive on a periodic basis upon successive receipt of the sixth message bit, the capacitor 335 remains sufficiently charged via the charge path including a source of positive potential 336, a resistor 337, and a diode 338. With capacitor 335 charged, the transistor Q19 is maintained conductive providing a low-level signal at the collector thereof which constitutes the output of the sixth bit missing circuit 159. With transistor Q19 normally conducting and a low-level signal provided at the collector thereof, a low-level signal is input on line 114–1 of the circuit fault indicator 114 from the sixth bit missing circuit 159. Such a low-level signal does not produce a circuit fault indication.

However, should the sixth message bit be missing for some specified arbitrary period of time, for example, 5 seconds, transistor Q23 is not periodically rendered nonconductive once per received message following receipt of the sixth message bit and the capacitor 335 does not remain charged, with capacitor 335 uncharged, the normally conductive transistor Q19 is rendered nonconductive. With transistor Q19 nonconductive the collector, thereof, which constitutes the output of the sixth bit missing circuit 159, switches to a high level providing an input to the circuit fault indicator 114 on line 114–1. This input, in a manner described previously in connection with the input on line 108 via inverter 315 and diode 316, may cause a circuit fault indication if it persists for a sufficiently long period, namely, 30 seconds.

For the purpose of detecting when an inverted alarm identity code group bit is received, and providing an indication to the central station personnel respecting which particular alarm condition sensor 15–17 at the remote station 10 has been activated, three alarm identity code group bit inversion detector circuits 112–7, 112–8 and 112–9 are provided. Detector circuits 112–7, 112–8 and 112–9 detect and provide indications of the receipt of inverted seventh, eighth, and ninth message bits associated with the alarm condition detectors 15, 16 and 17, respectively. Since the detector circuits 112–7, 112-8 and 112-9 are identical in structure and operation, only detector 112-7 is described in detail.

The alarm identity code group bit inversion detector 112-7 which detects the inversion of the seventh message bit which constitutes the first bit of the alarm identity code group and is associated with alarm condition detector 15, includes the NAND gate circuit 113-7. The NAND gate circuit 113-7 is responsive to the received bit on line 71 via an inverter 340, the data sampling pulse on line 89b, and the seventh message bit on line 75a internally generated at the central station by the counter 70 and coder 75. The NAND gate circuit 113-7, more specifically, includes a NAND gate 341-7 which is responsive to the data sampling signal on line 89B, and via an inverter 342-7 to the internally generated seventh bit of the message output on line 75A from the coder 75, and produces on its output line a signal representing the coincidence of both the data-sampling signal and the internally generated seventh message bit. The output of the NAND gate 341-7 after inversion in inverter 343-7 is input to a NAND gate 344-7, the other input of which constitutes the received data bit on line 71 following an inversion in inverter 340. NAND gate 344-7 provides a logical "1" output if the seventh message bit received from the remote station and associated with alarm condition sensor 15 is in its normal or noninverted state, which is a logical "0" indicating that alarm condition sensor 15 has not been activated. NAND gate 344-7 provides a logical "0" output if the seventh message bit received from the remote station which is associated with alarm condition detector 15 is in its alarm or inverted state, which is a logical "1," indicating that alarm condition detector 15 has been activated.

To ensure that the alarm signal indicator 345-7 of indicator circuit 121-7 is not activated, indicating to central station personnel that the alarm condition detector 15 has been activated, in response to a spurious inversion of the seventh message bit, the output of NAND gate 344-7 following inversion in NAND gate 346-7 is input to a NAND gate 117-7, the other input of which constitutes the inverted output of the alarm condition code group inversion detector circuit 95 on line 104. If a complete inversion of the first six message bits corresponding to the alarm condition code group has occurred, a logical "1" is input to NAND gate 117-7 from the alarm condition code group inversion detector circuit 95. If the seventh message bit received from the remote station is also inverted indicating the activation of alarm condition detector 15, a logical "1" is input to the other input of NAND gate 117-7 from the output of NAND gate 346-7. With both inputs to NAND gate 117-7 at a logical "1" level, a logical "0" is output from NAND gate 117-7 to the latch circuit 119-7 causing the flip-flop 347-7 of the latch circuit to be set and latched. Thus, the flip-flop 347-7 of latch circuit 119-7 is set and latched when a logical "0" is output from NAND gate 117-7 indicating that both the seventh message bit corresponding to alarm condition sensor 15 and the six bits of the alarm condition code group are inverted.

The latch circuit 119-7 is identical in structure and operation to the circuit fault latch 318 of the circuit fault indicator 114. Additionally, transistors Q31, Q32 and Q51 and the signal device 345-7 are identical in structure and operation to the transistors Q30, Q29 and Q50 and the circuit fault signal device 395 of the circuit fault indicator 114. Thus, when the flip-flop 347-7 of latch circuit 119-7 is set, producing a logical "1" on its output line 348-7, corresponding to inversion of both the seventh message bit and the alarm condition code group, transistors Q31, Q32 and Q51 are rendered conductive providing an input to signal device 345-7 which activates this signal device to alert central station personnel that the alarm condition detector 15 at the remote station has been activated. The indication provided by the signal device 345-7, is until actuation of the silence switch 330, of a flashing or intermittent nature as was the initial activation of the circuit fault signal device 319. However, upon momentary actuation of silence switch 330 which sets flip-flop 349-7, transistor Q31 is rendered continuously conductive providing a continuous input to the signal device 345-7 producing a continuous indication for the benefit of central station personnel. The continuous indication provided by signal device 345-7 is terminated when the alarm condition causing activation of alarm condition detector 15 terminates and the alarm condition code group and the seventh message bit are no longer inverted.

The security/access mode detector 125 is provided to indicate to central station personnel the mode, secure or access, of the remote station. The security/access mode detector 125 includes a NAND gate circuit 126 which is responsive to the internally generated 10th message bit on line 78A produced by the coder 78 and counter 70, the data-sampling pulse on line 89B, and the 10th data bit received from the remote station on line 71 via inverter 340. The NAND gate circuit 126 includes a NAND gate 126-1 which is responsive to the internally generated 10th message bit output on line 78A from coder 78 which is inverted by an inverter 126-2, and the data-sampling output on line 89b. The NAND gate 126-1 provides a logical "0" upon coincidence of the internally generated 10th message bit and the data-sampling signal. The output of NAND gate 126-1 is inverted by an inverter 126-3 and input to a NAND gate 126-4 along with the 10th message bit received from the remote station and present on line 71 via inverter 340. The NAND gate 126-4 has its output connected to a flip-flop 126-5 which provides on output line 127 a logical "1" when the system is in the access mode and a logical "0" when the system is in the secure mode. The output on line 127 is input to the base of transistor Q38 of an indicator driver circuit 128. The output of the transistor Q38 is taken at the collector thereof and input via a diode 350 and a resistor 351 to the base of a transistor Q37. The output of transistor Q37 is taken at the collector and is also input to the base of a transistor Q39. The output of transistor Q39 is taken at the collector and is input to the base of a transistor Q42, the emitter-collector path of which is in series with an access mode indicator 132. The collector of transistor Q42 is also connected to the collector circuit of a transistor Q41. The emitter of transistor Q41 is connected to the base of a transistor Q40, the emitter-collector path of which is in series with the secure mode indicator 130.

When a logical "1" is present on line 127 indicating the secure mode, transistor Q38 is on, transistor Q37 is off, transistor Q39 is on, and transistor Q42 is off causing transistors Q41 and Q40 to be rendered conductive and the secure indicator 130 to be activated to indicate to the central station personnel that the remote station is in the secure mode. When a logical "0" is present on line 127 indicating the access mode, transistor Q38 is on, transistor Q37 is on, transistor Q39 is off, and transistor Q42 is on causing indicator 132 to be activated indicating that the system is in the access mode.

When the access indicator 132 is activated to indicate switching of the system from the secure to the access mode, the access indicator is energized via the emitter-collector path of the transistor Q42 on a continuous basis providing a continuous indication to the operating personnel. However, when the secure mode indicator 130 is initially activated, the secure indicator is energized on an intermittent or flashing basis and remains such until a silence switch 353 is momentarily activated.

A source of pulsating unidirectional flasher potential 354 is connected via a resistor 355 and a diode 356 to the base of transistor Q41 causing transistor Q41 to be alternatively conductive and nonconductive in turn causing transistor Q40 to be alternately conductive and nonconductive and the indicator 130 to be operated on an intermittent or flashing basis. However, when the silence switch 353 is momentarily activated, a normally nonconductive transistor Q70 is switched to a conductive state. This causes a flip-flop 352 to switch and apply a continuous positive potential via resistor 359 and diode 358 to the base of transistor Q41. This causes transistor Q41 to conduct on a continuous basis, in turn causing transistor Q40 to operate continuously saturated, continuously energizing the secure indicator 130. When the system again switches from the secure to the access mode and the transistor Q42 is rendered conductive, grounding the collector of transistor Q42, the flip-flop 352 is reset, removing the positive potential applied to the base of transistor Q41 via resistor 359 and diode 358. This then prevents conduction of transistor Q41 and operation of the secure indicator 130. Activation of silence switch 353 also removes the source 65 from relay K2, deenergizing this relay, which in turn energizes the line 14. Energization of the line 14 energizes relay K4 at the remote station 10. Assuming that the switch 353 is maintained closed sufficiently long, for example, 1 second, the relay K4 is energized for 1 second. Energization of relay K4 for 1 second causes the capacitor 400 to charge through resistors 401 and 402, turning on normally nonconducting transistor Q71. This, in turn, causes normally conducting transistor Q72 to turn off and activate an indicator 405. Actuation of indicator 405 constitutes an acknowledgement to the remote station by the central station of the fact that the central station is aware that the remote station has switched from the access mode to the secure mode.

The end of message circuit 140 is provided to supply on line 144, constituting the output thereof, an end of message signal following receipt of the 10th and last message bit. The end of message circuit 140 includes a capacitor 360 which is normally in a charged condition by virtue of a charge path including a source of positive potential 361, a resistor 362, and a diode 363. The capacitor 360 can discharge through a path including a resistor 364 in the emitter-collector path of a normally nonconducting transistor Q8. At the beginning of the interrogation period when the flip-flop 80 is set and its output terminal Q goes to a high potential level, the transistor Q8 is rendered conductive, completing the discharge path of the capacitor 360. The discharge time of the capacitor 360 is approximately 320 msec. Thus, approximately 320 msec. after the start of the interrogation period the capacitor is fully discharged, providing a low-level signal to the base of a normally nonconductive transistor Q14, switching this transistor into conduction. Conduction of transistor Q14 raises the potential of its collector causing a normally nonconductive transistor Q18 to be rendered conductive. Conduction of transistor Q18 lowers its emitter potential rendering nonconductive a transistor Q17. With transistor Q17 nonconductive the collector potential thereof rises applying a high-level signal or logical "1" to one input of the NAND gate 143. Thus, approximately 320 msec. following the start of the interrogation period a logical "1" input is provided to NAND gate 143 from the collector of transistor Q17.

The other input to the NAND gate 143 is provided by the output on line 88 from the flip-flop 85. It will be recalled that flip-flop 85 is normally in the reset condition providing on line 88, a high-level or logical "1" signal. However, when the transmission line is deenergized at the beginning of a response period, the relay K1 is energized, transferring its contact K1', to ground input line 62 of the flip-flop 85. This sets flip-flop 85, placing a low level or logical "0" signal on output line 88. Thus, if a response has been initiated following an interrogation period, a low-level signal or logical "0" is input to NAND gate 143 from the flip-flop 85, disabling the gate.

When, 320 msec. after the start of the interrogation period, an input is provided to NAND gate 143 from collector of transistor Q17 no output is provided from NAND gate 143 due the disablement thereof by the low-level or logical "0" signal on line 88 from the set flip-flop 85, produced as a consequence of a response. Should a response not be forthcoming following an interrogation period, which is the case should all 10 bits of the message have been transmitted, the flip-flop 85 is not set and a high-level signal is input to NAND gate 143 on line 88, enabling the gate. When, 320 msec. after the start of the interrogation period, a high-level or logical "1" signal is input to the NAND gate 143 from the collector of transistor Q17, an end of message signal is output on line 144 from the gate 143.

The low-level of logical "0" end of message output on line 144 is input to the flip-flops 97 and 105 of the alarm condition code group inversion detector circuit 95 and the circuit fault detector 96, resetting these flip-flops. Additionally the end of message output on line 144 is input to the counter 70, resetting the counter to a count of 0000, which synchronizes it with the remote station counter 30. The end of message output on line 144 is also connected to the emitter of a normally nonconducting transistor Q24, switching this transistor to a conductive state. Conduction of transistor Q24 effectively lowers the collector thereof to ground potential, providing an input to the delay period circuit 68, to be described.

The delay period circuit 68 includes a transistor Q15, the base of which is responsive to the output of flip-flop 80 on line 71. A capacitor 365 is also included in the delay period circuit 68 and includes a charge path comprising a source of positive potential 366, a resistor 367 and a diode 368, and a discharge path which includes a resistor 369 and the emitter-collector path of normally nonconducting transistor Q15. The capacitor 365 is normally charged, providing a relatively high-level signal to the base of transistor Q5, holding this transistor nonconductive, which in turn holds transistor Q1 nonconductive. With transistor Q1 off, a high-level output is provided on line 68–1 which constitutes the output of the delay period circuit 68. However, when the capacitor 365 is caused to discharge, which takes approximately 83 msec., either by the switching of transistor Q15 to a conductive state by an appropriate input on line 71 at the end of a response period when flip-flop 80 resets, or by an end of message signal on line 68–2 following transmission of all 10 message bits, a low-level output is provided to the base of transistor Q5, switching this transmission on, which in turn switches on transistor Q1. With transistor Q1 on, a low-level signal is provided on output line 68–1 of the delay period circuit 68. Thus, a low level is provided on delay period circuit output line 68–1 approximately 83 milliseconds after the delay circuit is provided with an input, either from the end of message circuit 140 on line 68–2 following transmission of the last message bit, or with an input from the flip-flop 80 on line 71 at the end of a response period during which time a message bit was transmitted.

The low-level signal output on line 68–1 from the delay period circuit 68 at the end of the delay period, which occurs approximately 83 milliseconds after the end of the response period, is input to the NAND gate 67 of the rest period circuit 69 via an inverter 370. The other input to the NAND gate 67 is provided by the collector of a transistor Q2 of the rest period circuit 69, to be described, which during the delay period, is in a nonconductive state, providing a relatively high-level or logical "1" input to the NAND gate 67. With high-level or logical "1" signals on both inputs to the NAND gate 67 from the collector of Q1 via inverter 370 and from the collector of transistor Q2, the NAND gate provides a low-level or logical "0" output on rest period circuit output line 66. This low-level signal on line 66 is input to the flip-flops 80 and 85, resetting flip-flop 85 and resetting flip-flop 80 if it has not previously been reset by the grounding of its input terminal 63 at the end of the response period. The output from NAND gate 67 on rest period circuit output line 66 is also input to the relay K2, energizing this relay. With relay K2 energized, its contact K2' transfers from the position shown in FIG. 10A, deenergizing the transmission line 14 and thereby initiating the beginning of the rest period. The low-level signal on rest period circuit output line 66 which holds relay K2 energized and the transmission line deenergized continues for the randomized curation of the rest period as established by the rest period circuit 69.

The rest period circuit 69 also includes a capacitor 373 which is adapted to charge from a source of positive potential 374 though a resistor 375 and a diode 376. The capacitor 373 is adapted to discharge through two parallel paths. One path includes a resistor 377 and the emitter-collector path of transistor Q1 which is only rendered conductive at the end of the delay period when the transistor is switched as a consequence of the discharge of capacitor 365 which provides a low-level signal on delay period circuit output line 68–1. The other discharge path for capacitor 373 includes a resistor 410, the emitter-collector path of a transistor Q75 and the emitter-collector part of the transistor Q1. The transistor Q75 is switched on and off periodically for periods of 75 msec. and 150 msec., respectively, by a transistor Q76 which in turn is switched on and off periodically for periods of 75 msec. and 150 msec., respectively, by the conduction and nonconduction, respectively, of a unijunction transistor 415. Conduction and nonconduction of unijunction transistor 415 is controlled by the discharging and charging of a capacitor 411 which has a discharge time through a resistor 413, a diode 414 and the emitter-collector path of transistor Q76 of 75 msec., and which has a charge time from a source 418 through a resistor 416 and a diode 417 of 150 msec. The unijunction transistor 415, and the capacitor 411, form part of a unijunction transistor oscillator circuit.

The length of the rest period is determined by the time it takes capacitor 373 to discharge, which in turn depends on whether one or both of the parallel resistors 377 and 410 are in the discharge path of the capacitor 373. The resistor 377 is part of the discharge path of capacitor 373 during every rest period since transistor Q1 is switched on at the beginning of every delay period. However, during the time transistor Q1 is switched on and capacitor 373 is discharging through resistor 377, the resistor 410 is connected in parallel with resistor 377 via conducting transistor Q75 for a period of time anywhere between 0 msec. and 75 msec. depending on the extent to which the conducting cycle of the unijunction oscillator 415, 411 overlaps the rest period as it would be established where capacitor 373 to discharge only through resistor 377. If the extent of overlap during the rest period is complete, transistor Q75 conducts for a period at least coextensive and coincident with the conduction of transistor Q1, thereby placing resistor 410 in parallel with resister 377 during the entire period of discharge of capacitor 373, producing the shortest possible rest period of 60 msec. If no overlap exists during the rest period, transistor Q75 does not conduct during the period that transistor Q1 conducts, and resistor 410 is not in parallel with resistor 377 during the rest period when capacitor 373 is discharging. Under these circumstances, the rest period is the longest possible, namely, 120 msec. Variations in overlap of conduction of transistors Q1 and Q75 between zero overlap and complete overlap produce variations in the length of the rest period between 60 msec. and 120 msec.

Since the conduction and nonconduction periods of the unijunction oscillator 411, 415 are not multiples of submultiples of the bit transmission cycle time, the extent of overlap is constantly varying, causing the length of the rest period to vary randomly between 60 msec. and 120 msec. With the rest period varying randomly in length, the delay between the initiation of an interrogation signal by the central station and the initiation of a response by the remote station is random, and hence the beginning of the bit transmission cycle is random. Such randomness in initiation of bit transmissions makes impossible defeat of the system by substituting on the transmission line a synthesized signal train obtained by monitoring the transmission line during normal, nonalarm periods.

The rest period circuit 69 includes a transistor Q6 which is normally nonconductive, but which is rendered conductive at the end of the rest period when capacitor 373 is discharged. A transistor Q2 which is also normally nonconductive and is rendered conductive at the end of the rest period by the switching of transistor Q6 in response to the discharge of capacitor 373 is provided. The signal on line 69–1 connected to the collector of transistor Q2 is normally at a high level enabling the NAND gate 67. However, when the capacitor 373 discharges, which randomly occurs approximately anywhere between 60 msec. and 120 msec. following the end of the delay period when the delay circuit output on line 68–1 causes transistor Q1 to switch to a conductive state, the transistor Q2 is rendered conductive providing a low-level signal on line 69–1. The low-level signal on line 69–1 disables the gate 67, providing a high-level signal on rest period circuit output line 66. The high-level signal on line 66 deenergized the relay K2, causing its contact K2' to transfer to the position shown in FIG. 10A, energizing the line and thereby establishing the beginning of the interrogation signal for the next message or bit transmission cycle.

Switching of transistors Q15, Q5, Q1, Q6 and Q2 to their normal states is accomplished by the high-level signal on line 71 which occurs at the beginning of the interrogation period when flip-flop 80 is set by the grounding of the input terminal 63 which occurs when relay K1 is deenergized by the energization of the telephone line 14. The low-level signal on line 71 at the start of the interrogation period renders transistor Q15 nonconductive, enabling capacitor 365 to charge and render transistor Q5 nonconductive. This in turn renders transistor Q1 nonconductive as well as transistors Q6 and Q2. Thus, both the delay period circuit 68 and the rest period circuit 69 are returned to their normal states.

The Exclusive OR circuit 110 is included for the purpose of providing on its output line 110A an input to the circuit fault indicator 114 via line 114–1, should a complete inversion of the alarm condition code group occur without receipt of an inverted alarm identity code group bit, or vice versa. The Exclusive OR circuit 110 includes as one input, the output of NAND gate 156. The NAND gate 156 is responsive to the outputs of flip-flops 346–7, 346–8, 346–9 of alarm identity code group bit inversion detectors 112–7, 112–8 and 112–9. If any one of the alarm identity code bit inversion detectors 112–7, 112–8 or 112–9 has detected the presence of an inverted alarm identity code group bit, a high-level signal is output from NAND gate 156. The other input to the Exclusive OR circuit 110 is provided by NAND gate 100 of the alarm condition code group inversion detector circuit 95. This input is provided on line 104.

In operation, if a signal is input to the Exclusive OR circuit 110 from the NAND gate 156, indicating receipt of an inverted alarm identity code group bit and a signal is not input to the Exclusive OR circuit on line 104 indicating that total inversion of the alarm condition code group has been detected, or vice versa, the Exclusive OR circuit 110 provides an output on line 110A to the circuit fault indicator 114, indicating the existence of a circuit fault condition. The circuit fault indicator 114, assuming the input thereto on line 110A exists for approximately 30 seconds, activates the circuit fault signal device 395 in a manner described previously in connection with the sixth bit missing circuit 159 and the circuit fault detector circuit 96.

The telephone line open circuit detector 150 is provided to supply an input to the circuit fault indicator 114 should the telephone line remain in the open circuit or deenergized condition for an excessive period of time. The telephone line open circuit detector 150 includes a capacitor 377 which, under normal conditions, remains charged holding transistor Q4 in a nonconducting state. The charge path for the capacitor 377 includes a source of potential 378, a resistor 379, the line from the terminal 62, and a diode 380. Should the telephone line remain in the open circuit condition for an excessive period of time, the capacitor 377 discharges to ground through resistor 381, terminal 62, and the transferred contact K1' of energized relay K1. When the capacitor 377 discharges, which takes approximately 0.5 seconds, the transistor Q4 is energized, raising the potential of its collector which provides an output on line 151 to the circuit fault indicator 114. If the input to the circuit fault indicator 114 exists for a sufficiently long-period time, approximately 30 seconds, the circuit fault signal device 395 is activated in the manner described previously.

The telephone line short circuit detector 153 includes a capacitor 382 which is adapted to charge from a source of potential 383 through a diode 384, but which is periodically discharged when a transistor Q7 is switched to its conductive state when the flip-flop 85 is reset at the beginning of the rest period and a high-level signal is provided on flip-flop output line 88. Should the relay K2 remain deenergized for an excessive time, energizing the telephone line for an excessive period, because of the failure of a set signal to be produced at the input T of flip-flop 85 indicating the beginning of a response, the low-level signal output on line 88 to the short circuit detector 153 does not occur as would normally happen and transistor Q7 is not rendered nonconductive to maintain charge on capacitor 382. Under such circumstances, the capacitor 382 continues to discharge through the resistor 384 and after approximately 0.5 seconds switches transistor Q13 on, raising the collector potential thereof. With an increased potential at the collector of transistor Q13, a high-level signal is provided on output line 154 of the short circuit detector 153. The output on line 154 is input to the circuit fault indicator 114 and if it persists for approximately 30 seconds activates the circuit fault signal device 395, in the manner described.

The regurgitate circuit 157 is provided to interrupt the telephone line 14 should the relay K1 remain deenergized for an excessive period, for example, 0.5 seconds. The regurgitate circuit 157 includes a capacitor 386 which is adapted to be normally charged from a source of positive potential 387 through the emitter-collector path of a transistor Q60, but which is adapted to discharge when terminal 63 is grounded by contact K1' which occurs when the telephone line is in the closed circuit or energized condition. If the telephone line is not placed in the open circuit condition periodically, as occurs in normal operation, but rather remains in the energized state, terminal 63 is grounded by relay contact K1' for an excessive period enabling the capacitor 386 to discharge. Discharging of the capacitor 386, which takes approximately 0.5 seconds, is effective to switch transistors Q12 and Q11, which are normally nonconductive, to a conductive state. Conduction of transistor Q11 lowers the collector potential thereof to approximately ground potential. Grounding of the collector of transistor Q11 provides a low-level signal on line 66 completing an energization circuit for the relay K2. Relay K2 upon energization, transfers its contact K2', interrupting the transmission line. Thus if the transmission line circuit is in a closed circuit condition for an excessive period, approximately 0.5 seconds, the capacitor 386 discharges switching transistors Q11 and Q12 to a conductive state thereby lowering the potential on line 66 and energizing relay K2 to open the transmission line via its transferred contact K2'.

A fail-safe circuit 390 is provided in the circuit fault indicator 114 to activate the circuit fault signal device 395 should a certain fault occur. Specifically, the fail-safe circuit 390 includes a transistor Q22 which is normally in a conductive state by virtue of the existence of a source of positive potential 393 which also provides power to other central station components. Should, however, the source of reference potential 393 fail, the transistor Q22 is rendered nonconductive raising its collector potential. An increase in collector potential of transistor Q22 is effective to switch on normally nonconducting transistor Q27. As described previously, when transistor Q27 is switched to a conductive state, its collector potential drops to approximately ground, setting the flip-flop 318-3 of the circuit fault latch circuit 318 in the manner described previously, activating the circuit fault signal device 395. Thus, if the reference potential source 393 which is used to provide power to a number of the circuit components of the central station should fail, the circuit fault signal device 395 is activated.

The fail-safe circuits 391, 391-7, 391-8 and 391-9 are provided to illuminate signal devices 319, 319-7, 319-8 and 319-9 under a number of circuit fault conditions. Since fail-safe circuits 391, 391-7, 391-8 and 391-9 are identical in structure and operation, only circuit 391 is described. Under normal conditions, i.e. regardless of whether transistor Q50 conducts heavily or lightly, a voltage drop appears across a resistor 398, causing the signal device 319 to remain extinguished. Should, however the base of transistor Q50 be interrupted, or the circuit fault signal device 395 burn out or fail, or source 397 be disconnected, the signal device 319 is illuminated. Such results because the transistor Q50 ceases to conduct altogether, producing no voltage drop across the resistor 398, in turn permitting the signal device 319 to be activated.

A brief description of the operation of the central station circuit of FIGS. 10A-10F now follows. Assuming the system is in the rest period, a low-level signal is output from NAND gate 67 on rest period circuit output line 66 energizing the relay K2. With relay K2 energized its contact K2' is transferred from the position shown in FIG. 10A interrupting the transmission line. Upon expiration of the rest period when the capacitor 373 has fully discharged, transistors Q6 and Q2 of the rest period timer circuit 69 (FIG. 10B) switch to their conductive states providing at the collector of transistor Q2 a low-level signal which disables NAND gate 67 terminating the low-level signal on rest period circuit output line 66. With the signal on line 66 now at a high level, the relay K2 is deenergized, enabling the contact K2' to return to its normally closed position energizing the telephone line. Energization of the telephone line by closure of relay contact K2' starts the interrogation period. Additionally, the high-level signal on rest period circuit output line 66 removes the reset input to clear terminals of flip-flops 80 and 85. When the transmission line is energized, relay K1 becomes deenergized, transferring its contact to the position shown in FIG. 10A, grounding terminal 65, which is input to terminal T of flip-flop 80, causing this flip-flop 80 to be set. Setting of flip-flop 80 provides a low-level signal on line 71 to the delay period timer 68, causing the transistors of the delay period timer 68 and of the rest period timer 69 to return to their normal states of conduction and nonconduction, as the case may be. The setting of flip-flop 80 at the start of the interrogation period is also effective to start the end-of-message circuit 140 in a manner described previously, which 320 msec. later provides an input to NAND gate 143. The setting of flip-flop 80 also provides an input on line 82 to the counter 70, advancing the counter to the next count to cause internal generation of the first normal message bit by coder 73.

Energization of the telephone line at the start of the interrogation period is also effective to energize relay K4 at the remote station which after a suitable 60-msec. delay causes remote station relay K3 to be energized to start the response period by open circuiting the transmission line via the transfer of normally closed relay contact K3'. When contact K3' transfers to its open condition coincident with the start of the response period of a bit transmission cycle, central station relay K1 which was deenergized during the interrogation period, now becomes energized transferring its contact K1' from the position shown in FIG. 10A, grounding terminal 62 connected to terminal T of flip-flop 85, causing this flip-flop to be set. Setting of flip-flop 85 provides a low-level output on line 88 disabling NAND gate 143 to prevent an end-of-message signal from being provided on line 144 by the end-of-message circuit 140. The setting of flip-flop 85 at the beginning of the response period is also effective to provide an input to the data-sampling pulse generator 86 causing, after a delay of approximately 103 msec. a data-sampling pulse on line 89B. The data-sampling pulse, in a manner described previously, is effective to sample the state of the flip-flop 80 for the purpose of establishing whether the response was a logical "0" of a logical "1" and compare the received bit with the bit internally generated at the central station by the counter 70 in conjunction with the coder 73.

At the end of the response period when the remote station relay K3 is deenergized and its contact K3' transferred to its normally closed position, the transmission line is again energized. Energization of the transmission line is effective to deenergize the central station relay K1, causing its contact K1' to transfer to the position shown in FIG. 10, again grounding terminal 63 which is input to terminal T of flip-flop 80. This resets flip-flop 80 at a point in time coincident with the end of the response period. The resetting of flip-flop 80 resets the end-of-message circuit, readying it for the next bit transmission cycle.

Additionally, the resetting of flip-flop 80 provides a high-level signal on line 71 which is input to the delay period timer circuit 68. The effect of this input to the delay period timer circuit 68 is to start the discharge of capacitor 365. When capacitor 365 discharges, which occurs approximately 83 msec. following the end of the response period, a signal is output from the delay period timer circuit 68 on line 68–1. This output from the delay period circuit timer 68 on line 68–1 is input to the rest period timer circuit 69 where it is inverted by inverter 370 and then input to NAND gate 67, producing a low-level signal on rest period timer circuit output line 66 for energizing relay K2. Energization of relay K2 transfers its contact K2' from the position shown in FIG. 10, interrupting power of the transmission line.

The rest period is now initiated. The output on line 68–1 from the delay period circuit timer 68, which is input to the rest period timer 69, also causes capacitor 373 to start to discharge. Depending on the degree of overlap in conduction of transistors Q1 and Q75 introduced by the unijunction transistor oscillator 415, 411, the capacitor 373 takes anywhere between approximately 60 msec. and 120 msec. to discharge, corresponding to the minimum and maximum interval for the random duration rest period. When the capacitor 373 has discharged, an output is provided on line 69–1 to the NAND gate 67 disabling this NAND gate and terminating the low-level signal on rest period circuit output line 66. Relay K2 now becomes deenergized, and its contact K2' transfers to the closed position shown in FIG. 10, once again initiating the interrogation period.

As the foregoing sequence of interrogation, response delay, and rest periods continues, the bits received from the remote station are compared with their counterparts internally generated at the central station. If inversion of one or more of the message bits received from the remote station occurs, the various indicator devices 395, 345–7, 345–8, and 345–9 are activated depending upon whether a circuit fault has occurred or activation of one of the alarm-condition-responsive devices 15–17 has occurred.

When the 10th and last message bit indicating the mode (secure or access) of the remote station is received, and the appropriate signal device 130 or 132 activated, a complete message transmission operation has been accomplished. The next interrogation signal to the remote station is interpreted by the remote station counter 30 as the 11th interrogation pulse, in a manner described, in connection with the description of the remote station, and is effective to reset the counter 30, producing no response. When no response is received at the central station, the flip-flop 85, which is normally set at the beginning of the response period, is not set. Failure to set the flip-flop 85 results in the failure to produce on line 88 the disable input to NAND gate 143. In the absence of the disable input on line 88 to the NAND gate 143, when the end-of-message circuit 140 produces its input to NAND gate 143 an output is produced on line 144 indicating that the remote station has concluded the transmission of all 10 bits of the message. The output on line 144, in a manner described previously, is effective to switch transistor Q24 and provide an input on line 68–2 to the delay period circuit 68 to initiate the normal delay period of 83 msec. which is followed by the random length rest period of 60 msec. to 120 msec. Following the delay period and rest period initiated by the output on line 144 of the end-of-message circuit 140, an interrogation period is initiated which is effective to start the message transmission cycle once again. The end-of-message signal on line 144 is also input to the counter 70, resetting the counter so that it is synchronized with the remote station counter 30. The end-of-message signal line 144 is input to the flip-flops 97 and 105 of the alarm condition code group inversion detector 95, and the circuit fault detector 96, resetting these circuits.

If desired, the alarm condition code group which is transmitted by the remote station may be changed from the central station. This makes compromise or defeat of the system by signal transmission monitoring and synthesis even more difficult. One possible form of circuit structure capable of enabling the alarm condition code group to change from the central station is depicted in FIG. 11. The circuit structure of FIG. 11 includes a transmission link between the remote station 10' and the central station 12' which may be in the form of a telephone line 14'. The transmission line 14' is capable of being energized by a source of direct current 300' when a normally open switch 7 is closed. When the line 14' is energized by closure of switch 7 relays K5 and K6 located at the remote and central stations, respectively, are energized, for reasons to be described.

The relay K5 has a normally closed set of contacts K5' and a normally open set of contacts K5" which are connected between certain ones of the outputs of the multistage remote station counter 30' and inputs of the alarm condition code group coder 31'. When the switch 7 is closed and relay K5 energized the normally closed and open contacts K5' and K5" open and close, respectively, altering the interconnection of the outputs of the stages of the counter 30' and inputs of the alarm condition code group coder 31'. With the interconnection of the remote station counter 30' and the alarm condition code group coder 31' altered, the bit composition of the six-bit alarm condition code group is altered.

To prevent the central station 12' from producing a false alarm subsequent to a change in the bit composition of the alarm condition code group generated at the remote station, the interconnection of the outputs of the stages of the central station alarm condition code group coder 73' and counter 70' is changed to correspond to that made at the remote station. This is accomplished by the relay K6 which is adapted to be energized coincidentally with the relay K5. The relay K6 has a normally closed set of contacts K6' and a normally open set of contacts K6". Contacts K6' and K6" are interconnected between the outputs of the alarm condition code group coder 73' and the counter 70' in a manner identical to the manner in which the contacts K5' and K5" are interconnected between the counter 30' and the alarm condition code group coder 31'. Accordingly, when the relay K6 is energized by closure of switch 7 and contacts K6' and K6 " open and close, respectively, the bit composition of the alarm condition code group internally generated at the central station by the central station counter 70' and the alarm condition code group coder 73' is changed to correspond to the changed alarm condition code group generated at the remote station.

Thus, by closing or opening the switch 7, and thereby energizing and deenergizing the relays K5 and K6, the interconnections between the remote and central station counters 30' and 70' and their respectively associated alarm condition code group coders 73' and 71' can be changed to alter the composition of the alarm condition code group, making defeat or compromise of the system by signal transmission monitoring and synthesis more difficult.

In accordance with one embodiment of the system (not shown) the signal transmission link between the central station and the remote station is a voice grade telephone line over which pulse-width-modulated binary signals are transmitted by carrier frequency modulation techniques. In accordance with this embodiment, wherein voice grade telephone lines are utilized, in contrast to the lesser grade lines utilized in the 20 Baud DC system of FIGS. 1–10, binary signals or bits are transmitted by frequency modulating the output of a carrier frequency oscillator for different length predetermined intervals depending upon whether a logical "0" or a logical "1" is to be transmitted. This is in contrast to interrupting the DC-powered telephone line, which telephone line is not voice grade quality, for different periods depending upon whether a logical "0" or a logical "1" is to be transmitted. In accordance with a third embodiment, also not shown, the transmission link between the central and remote stations is a microwave transmission system. The manner of transmitting pulse width modulated binary signals in the microwave transmission system embodiment is similar to that for the carrier system using voice grade telephone lines.

We claim:

1. A system for individually monitoring at a central station the condition, alarm or nonalarm, of a plurality of alarm condition sensors located at a remote station, said system comprising:

first transmitting means at said remote station which are responsive to each of said alarm condition sensors for transmitting to said central station a first sequence of width-modulated binary signals when none of said alarm condition sensors is in an alarm condition and for transmitting to said central station a complete inversion of said first sequence of width-modulated binary signals when one of said sensors is in an alarm condition, second transmitting means at said remote station which are responsive to each of said sensors for transmitting to said central station a second sequence of width-modulated binary signals when none of said sensors is in an alarm condition, said second signal sequence having at least as many signals as there are sensors to be individually monitored with each sensor associated with a different signal, said second transmitting means operative to transmit an inversion of a sensor-associated signal when said associated sensor is in an alarm condition, means at said central station for interrogating said first and second remote station transmitting means prior to the transmission of each width-modulated signal or inversion thereof of said first and second sequences, first detecting means at said central station for analyzing the signals transmitted by said first transmitting means to determine if said complete inversion of first signal sequence thereof was transmitted, second detecting means at said central station for analyzing the signals transmitted by said second transmitting means to determine if said inversion of a sensor-associated signal was transmitted, and a plurality of alarm indicators each corresponding to a different one of said remote station sensors, and each responsive to both said first and second detectors, each said indicator being activated to alert central station personnel that its respective remote station sensor is in an alarm condition in response to both the detection by said first detecting means of the transmission of a complete inversion of said first signal sequence and the detection by said second detecting means of the transmission of an inversion of its respective sensor-associated signal.

2. The system of claim 1 further including a third detecting means for analyzing the signals transmitted by said first transmitting means to determine if at least one but less than all of said first signals are inverted, and a circuit fault indicator responsive to said third detecting means for altering central station personnel to the existence of a fault condition when at least one but less than all of said first signals are inverted.

3. The system of claim 1 further including fault-detecting means for determining when only one of said inverted first signal sequence and inverted sensor-associated signal is transmitted.

4. The system of claim 3 wherein said fault-detecting means includes Exclusive-OR circuit means responsive to both said first and second detecting means, for providing an output when only one of said first and second detecting means detects its respective signal condition.

5. The system of claim 1 wherein said first detecting means includes means to internally generate at said central station said first signal sequence, means responsive to said internally generated first signal sequence and the signals transmitted by said first transmitting means for providing a first output when at least one of said internally generated signals and said signals transmitted by said first transmitting means does not match and a second output when none of said internally generated signals and said signals transmitted by said first transmitting means match, and coincidence circuit means responsive to said first and second outputs for detecting when both outputs are present and thereby determining the existence of a complete inversion of said first signal sequence.

6. A system for monitoring at a central station the condition, alarm or nonalarm, of an alarm condition sensor located at a remote station, said system comprising:

a code generator at said remote station for generating a normal sequence of width-modulated binary signals, when said alarm condition sensor is in said nonalarm condition, and for generating an alarm sequence of width-modulated binary signals when said sensor is in said alarm condition, interrogation means at said central station for transmitting interrogation signals to said remote station, said interrogation signals being transmitted at least at the rate of one interrogation signal per width-modulated binary signal transmitted by said remote station, transmitting means at said remote station responsive to said interrogation signals for causing said code generator to transmit width-modulated signals of either said alarm or nonalarm sequence, each of said signals of said transmitted sequence being transmitted in response to receipt of a separate interrogation signal, and detector means at said central station for analyzing said transmitted signal sequence to determine the existence of an alarm condition at said remote station.

7. A system for monitoring at a central station the condition, alarm or nonalarm, of an alarm condition sensor located at a remote station, said system comprising:

a telephone line transmission means interconnecting said remote and central stations, said transmission means having a predetermined maximum transmission rate requiring a specified minimum lapsed time interval between the transmission of successive signals, interrogation signal initiation means at said central station for initiating interrogation signals, interrogation signal termination means at said remote station responsive to the receipt of an interrogation signal initiated by said central station for terminating said interrogation signal after a delay following receipt thereof at least equal to said minimum interval, code transmission means at said remote station for transmitting, in response to successive interrogation signals, a sequence of successive width-modulated binary signals at the rate of one binary signal per interrogation signal, said code transmission means including a multistage binary counter having an input responsive to the receipt of an interrogation signal for incrementing said counter and having a plurality of outputs from said stages connectable for facilitating transmission of a first repetitive sequence of width-modulated binary signal sequences, said counter stage outputs being connectable in different manners to produce different repetitive signal sequences, said counter in response to the receipt of an interrogation signal following transmission of the last binary signal of said sequence being reset and not responsive for transmitting a binary signal until receipt of the next interrogation signal, a detector means at said central station for analyzing said transmitted signal sequence to determine the existence of an alarm condition at said remote station, said detector means including a multistage binary counter having an input responsive to the transmission of an interrogation signal for incrementing said counter and a plurality of counter stage outputs for facilitating generation of a second repetitive sequence of signals related to said first sequence, said counter stage outputs being connectable in different manners to produce different repetitive signal sequences related to said different repetitive signal sequences of said remote station counter, and counter synchronization means at said central station for resetting said central station counter in response to the failure of said remote station to transmit a width-modulated signal following receipt of an interrogation signal, thereby synchronizing said remote and central station counters.

8. The system of claim 7 wherein said remote station detector includes signal-sampling means operative in response to receipt of a binary signal for generating a sampling pulse for sampling said transmission line means to determine the nature of the binary signal transmitted, whereby the analysis of the received signals is independent of variations in transmission line delays.

9. The system of claim 1 wherein said first and second transmitting means collectively include a multistage binary counter having an input responsive to the receipt of an interrogation signal for incrementing said counter and having a plurality of counter stage outputs connectable for facilitating transmission of a first repetitive sequence of width-modulated binary signals, said outputs being connectable in different manners to produce different repetitive signal sequences, said counter in response to the receipt of an interrogation signal following transmission of the last binary signal of said sequence being reset and not responsive for transmitting a binary signal until receipt of the next interrogation signal, and wherein said detector means at said central station includes a multistage binary counter having an input responsive to the transmission of an interrogation signal for incrementing said counter and a plurality of counter stage outputs for facilitating generation of a second repetitive sequence of signals related to said first sequence, said counter stage outputs being connectable in different signal sequences related to said different signal sequences of said remote station counter, and wherein said central station further includes counter synchronization means for resetting said central station counter in response to the failure of said remote station to transmit a width-modulated signal following receipt of an interrogation signal, thereby synchronizing said remote and central station counters.

10. A system for monitoring at a central station the condition, alarm or nonalarm, of an alarm condition sensor located at a remote station, said system comprising:
a code generator at said remote station for generating a normal sequence of binary signals, when said alarm condition sensor is in said nonalarm condition, and for generating an alarm sequence of binary signals when said sensor is in said alarm condition,
interrogation means at said central station for transmitting interrogation signals to said remote station, said interrogation signals being transmitted at least at the rate of one interrogation signal per binary signal transmitted by said remote station,
transmitting means at said remote station responsive to said interrogation signals for causing said code generator to transmit signals of either said alarm or nonalarm sequence, each of said signals of said transmitted sequence being transmitted in response to receipt of a separate interrogation signal,
randomizing means for randomly varying the time interval between successive binary signal transmissions, and
detector means at said central station for analyzing said transmitted signal sequence to determine the existence of an alarm condition at said remote station.

11. The system of claim 10 wherein said central station interrogation means includes a delay circuit for initiating said interrogation signals following receipt of transmitted binary signals after delay intervals, and wherein said randomizing means includes means associated with said delay circuit for randomly varying said delay intervals and thereby randomly varying the time interval between successive binary signal transmissions.

12. The system of claim 10 wherein said code generator includes a multistage binary counter having an input responsive to the receipt of successive interrogation signals for successively incrementing said counter and having a plurality of outputs from said stages connectable for facilitating transmission of a first sequence of binary signals when successively incremented, said counter stages being connectable in different manners to produce different signal sequences, and wherein said detector means includes a multistage binary counter having an input responsive to the transmission of an interrogation signal for incrementing said counter and having a plurality of counter stage outputs for facilitating generation of a second sequence of signals related to said first sequence, said detector counter stages being connectable in different manners to produce different signal sequences related to said first signal sequences of said remote station, and
signal-sequence-changing means activated at said central station for similarly altering the interconnection of said remote station counter outputs and the interconnection of said central station counter outputs to thereby similarly alter the binary signal composition of said remote and central station binary signal sequences.

13. The system of claim 1 further including randomizing means for randomly varying the time interval between successive binary signal transmissions.

14. The system of claim 13 wherein said central station interrogation means includes a delay circuit for initiating said interrogation signals following receipt of transmitted binary signals after delay intervals, and wherein said randomizing means includes means associated with said delay circuit for randomly varying said delay intervals and thereby randomly varying the time interval between successive binary signal transmissions.

15. A system for individually monitoring at a central station the condition, alarm or nonalarm, of a plurality of alarm condition sensors located at a remote station, said system comprising:
first transmitting means at said remote station which are responsive to each of said alarm condition sensors for transmitting to said central station a normal sequence of width-modulated binary signals when none of said alarm condition sensors is in an alarm condition and for transmitting to said central station an alarm sequence of width-modulated binary signals when one of said sensors is in an alarm condition, said transmitting means including multistage binary counting means having input means responsive to the receipt of successive interrogation signals for successively incrementing said counting means and having a plurality of outputs from said stages connectable for facilitating transmission of said sequences of signals when successively incremented, said stages being connectable in different manners to produce different signal sequences,
second transmitting means at said remote station which are responsive to each of said sensors for transmitting to said central station a sensor identity sequence of width-modulated binary signals when none of said sensors is in an alarm condition, said sensor identity signal sequence having at least as many signals as there are sensors to be individually monitored with each sensor associated with a different signal, said second transmitting means operative to transmit an inversion of a sensor-associated signal when said associated sensor is in an alarm condition,
means at said central station for interrogating said first and second remote station transmitting means prior to the transmission of each width-modulated signal,
first detecting means at said central station for analyzing the signals transmitted by said first transmitting means to determine if said alarm signal sequence was transmitted,
second detecting means at said central station for analyzing the signals transmitted by said second transmitting means to determine if said inversion of a sensor-associated signal was transmitted, said detecting means including multistage counting means having an input responsive to the transmission of an interrogation signal for incrementing said counter and having a plurality of counter stage outputs for generation of a signal sequence related to said normal signal sequence, and counter outputs being connectable in different manners to produce different signal sequences related to said different signal sequences of said remote station, a plurality of alarm indicators each corresponding to a different one of said remote station sensors, and each responsive to both said first and second detectors, each said indicator being activated to alert central station personnel that its respective remote station sensor is in an alarm condition in response to both the detection by said first detecting means of the transmission of said alarm signal sequence and the detection of said second detecting means of the transmission of an inversion of its respective sensor-associated signal, and signal-sequence-changing means activated at said central station for similarly altering the interconnection of said remote station counter outputs and the interconnection of said central station counter outputs to thereby similarly alter the binary signal composition of said remote and central station binary signal sequences.

16. The system of claim 10 wherein said transmitting and interrogating means include carrier frequency signal generators and wherein the output of said code generator frequency modulates the output of said transmitting carrier frequency signal oscillator.

17. The system of claim 1 further including a third detecting means for analyzing the signals transmitted by said first transmitting means to determine if at least one but less than all of said first signals are inverted, said third detecting means providing an output signal upon inversion of at least one but less than all of said first signals, a circuit fault indicator responsive to said output of said third detecting means for alerting central station personnel to the existence of a fault condition when said output of said third detecting means if produced for a specified interval indicating multiple inversions of at least one but less than all of said first signals.

18. The system of claim 6 further including means at said remote station for selectively enabling and disabling said sensor, a second code generator at said remote station for generating different sensor status signals indicating the enabled and disabled status of said sensor, said status signals being input to said transmitting means for transmission to said central station, sensor status detector means at said central station responsive to said transmitted status signals for indicating a change in status of said sensor, and means at said central station for transmitting to said remote station a signal indicating detection by said status detector of a change in status of said sensor, thereby alerting remote station personnel to the fact that central station personnel are aware of the changed status of said sensor.

In a system having a fault detector and a fault indicator responsive to said detector for indicating the existence of a fault, a signalling circuit for signalling failure of said fault-responsive indicator, said signalling circuit comprising:

a transistor having its emitter-collector path in series with said fault indicator and its base responsive to said fault detector for allowing current from a source to flow through and activate said fault indicator in response to an output from said fault detector accompanying the detection of a fault, said transistor being biased to conduct insufficiently to activate said fault indicator in the absence of said fault detector output, resistive means connected to pass said current flow through said indicator, a signal device responsive to the voltage across said resistive means for activating said signal device when said voltage is zero, due to interruption of said base, failure of said source, or failure of said fault indicator, said signal device remaining unactivated in response to the existence of voltages across said resistive means due to said current flow and said insufficient transistor conduction.